(12) United States Patent
Landry et al.

(10) Patent No.: US 8,903,676 B2
(45) Date of Patent: Dec. 2, 2014

(54) SENSORS, SYSTEMS, AND METHODS FOR MEASURING FLUID PERTURBATION

(75) Inventors: Blake Jude Landry, Champaign, IL (US); James Emory Palmer, III, Lafayette, LA (US)

(73) Assignee: Blake Jude Landry, Champaign, IL (US)

(*) Notice: Subject to any disclaimer, the term of this patent is extended or adjusted under 35 U.S.C. 154(b) by 577 days.

(21) Appl. No.: 12/803,991

(22) Filed: Jul. 12, 2010

(65) Prior Publication Data
US 2012/0010844 A1 Jan. 12, 2012

(51) Int. Cl.
  G01D 1/00 (2006.01)
  G01F 23/00 (2006.01)
  G01F 23/24 (2006.01)
  G01C 13/00 (2006.01)

(52) U.S. Cl.
  CPC .......... G01F 23/242 (2013.01); G01F 23/243 (2013.01); G01C 13/002 (2013.01)
  USPC ..................................... 702/127; 73/304 R

(58) Field of Classification Search
  USPC ......... 702/127, 50, 53, 55, 64–67, 69–71, 81, 702/84, 182–183, 189; 73/1.31, 1.73, 290 R, 73/291, 304 R
  See application file for complete search history.

(56) References Cited

U.S. PATENT DOCUMENTS

| | | | | |
|---|---|---|---|---|
| 3,983,750 A | * | 10/1976 | Kirkland | 73/170.31 |
| 4,064,755 A | * | 12/1977 | Bongort et al. | 73/313 |
| 4,287,756 A | * | 9/1981 | Gallagher | 73/64.55 |
| 4,382,382 A | * | 5/1983 | Wang | 73/304 R |
| 4,652,811 A | * | 3/1987 | Kwiat et al. | 324/696 |
| 5,032,794 A | * | 7/1991 | Ridd et al. | 324/365 |
| 5,553,494 A | * | 9/1996 | Richards | 73/304 R |
| 7,219,545 B2 | * | 5/2007 | Salzmann et al. | 73/304 R |

OTHER PUBLICATIONS

Walton, K., Sensor for the Measurement of the Level and Volume of Conductive Liquids, Apr. 1980, Rev. Sci. Instrum. 51(4), pp. 504-508.*
da Silva et al., Planar Array Sensor for High-speed Component Distribution Imaging in Fluid Flow Applications, Sensors 2007, pp. 2430-2445.*
Adam Randolph Crawford, Measurement and Analysis of Wave Loading on a Full Scale Coastal Structure, Oct. 1999, PH.D. Thesis, School of Civil and Structural Engineering, University of Plymouth, 290 pp.*

* cited by examiner

*Primary Examiner* — Toan Le
(74) *Attorney, Agent, or Firm* — Ian C. Barras; Raymond G. Areaux; Carver, Darden, Koretzky, Tessier, Finn, Blossman & Areaux, LLC

(57) ABSTRACT

Sensors, systems, and methods for measuring fluid perturbation are provided. One system includes a sensor module, a data management system, and a control system. In operation, data representing fluid is generated and recorded on the sensor module. During generating and recording, the sensor module is preferably partially submerged in a conductive fluid. The sensor module transmits the data representing fluid to the data management system in response to receiving data representing a record request from the data management system. Next, the data management system operates on the received data representing fluid to convert the data representing fluid into data representing fluid perturbation. Then the data management system stores the data representing fluid perturbation and transmits the data representing fluid perturbation to the control system. The control system stores the data representing fluid perturbation and displays the data representing fluid perturbation.

25 Claims, 11 Drawing Sheets

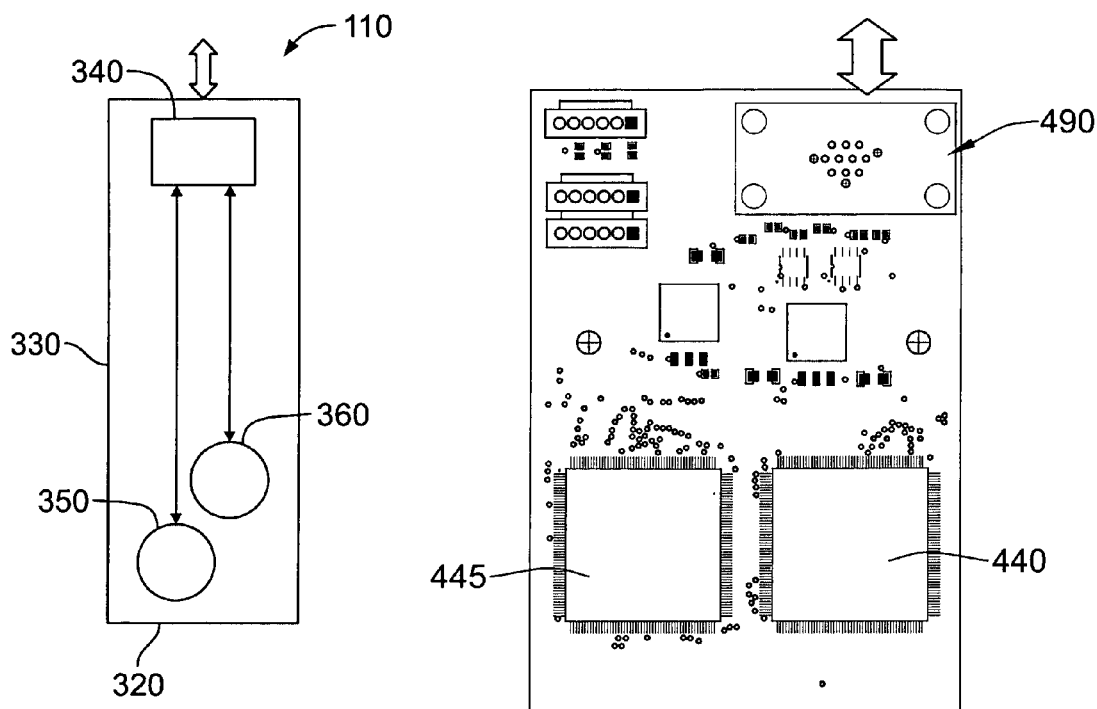
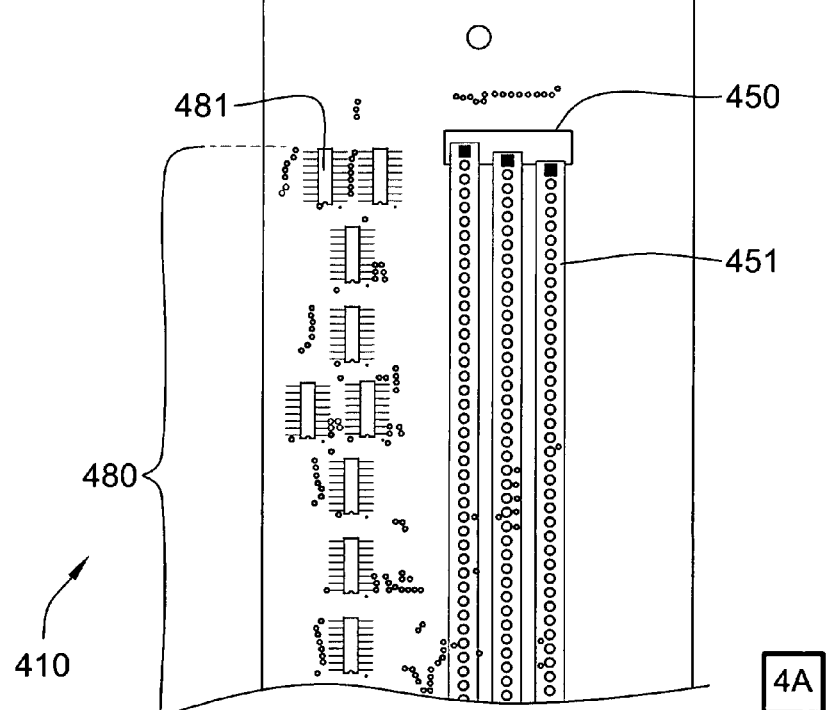
FIG. 3
FIG. 4A

SENSORS, SYSTEMS, AND METHODS FOR MEASURING FLUID PERTURBATION

BACKGROUND OF THE INVENTION

The present invention generally relates to measuring fluid perturbation. More particularly, the present invention relates to sensors, systems, and methods for measuring fluid height of linear waves and nonlinear waves.

Measuring fluid perturbation is important to scientists, researchers, and engineers. For example, wave measurements aid in understanding coastal dynamics. Indeed, wave measurements are important in determining the wave envelope, which gives information about incident wave amplitude and period, wave reflection, spatial variability of the wave field, and wave attenuation. All of the foregoing variables are used by scientists, researchers, and engineers to predict and explain coastal dynamics. Furthermore, liquid level measurements are important for hydrology and fluid processing in industrial settings.

Several prior art systems exist to measure fluid perturbation. For example, acoustic systems have been used to measure fluid perturbation. In an acoustic system, an acoustic sensor, such as an ultrasonic transducer, is located above a fluid. In operation, the acoustic sensor first transmits a sound wave toward the surface of the fluid. Then the acoustic sensor determines fluid perturbation by measuring the sound wave that reflects off the fluid surface.

Another example of a prior art system to measure fluid perturbation is a capacitance system. In a capacitance system, a capacitance probe, which is coated with a nonelectrical conducting material such as plastic, ceramic, or a polymer, is submerged in a fluid contained in a tank. The tank is grounded with a wire to earth ground. In operation, the capacitance probe is charged by passing a voltage from a control board. Fluid height is determined by measuring the time it takes to charge the capacitance probe because there is relationship between the time it takes to charge the capacitance probe and the fluid height in the tank.

Optical systems are still another example of a prior art system to measure fluid perturbation. In an optical system, cameras are installed around a fluid. In operation, fluid perturbation is determined from optical measurements.

The multilevel liquid sensing system disclosed in Wang, U.S. Pat. No. 4,382,382 is another example of a prior art system for measuring fluid perturbation. In the system of Wang, electronic signal detectors are coupled to typically 6 to 16 probe conductors. When a probe conductor is submerged in a liquid to be sensed, a digital output signal changes. The digital output signal is sent to an encoder and then presented to control circuitry of a device such as a home laundry and other household appliances.

The fluid level sensing system disclosed in Richards, U.S. Pat. No. 5,553,494 is another example of a prior art system for measuring fluid perturbation. In the system of Richards, typically up to 16 electrodes are installed in a pressure vessel to sense the resistivity of a fluid at different levels in the pressure vessel. The overall level measurement is accurate to about plus or minus 5 millimeters. While the typical electrode spacing is 50 millimeters, the system of Richards uses analog-to-digital converters to interpolate between electrodes to a resolution of about 1 millimeter. The system of Richards produces a digital output signal which may be used for control purposes of the pressure vessel.

The prior art systems to measure fluid perturbation have several disadvantages. Acoustic systems, for example, have a low sampling rate. In the acoustic system, one acoustic sensor usually only measures one fluid point. Accordingly, acoustic systems must use more than one acoustic sensor to measure more than one fluid point. When more than one acoustic sensor is used in an acoustic system, the acoustic system must coordinate the transmission of sound waves from each individual acoustic sensor towards the surface of the fluid to lessen the impact that sound wave interference has on measuring fluid perturbation. Considering the time it takes to coordinate the transmission of sound waves, acoustic systems have a sampling rate of about 10 Hz to 20 Hz.

Capacitance systems also have a low sampling rate. Between each fluid perturbation measurement the capacitance probe must be charged and discharged. Because the capacitance probe is electrically insulated it takes time to charge and discharge the capacitance probe. Furthermore, capacitance systems require frequent calibration, which is an inconvenience for users. Capacitance systems require frequent calibration because of drift in analog signals.

Optical systems that include cameras, for example, are difficult to use in field applications. While research laboratories have glass tanks where cameras may be installed, field applications may not have effective and convenient locations to install cameras. Accordingly, optical systems are not flexible systems.

Both the system of Wang and the system of Richards merely measure fluid perturbation for automation and control.

Importantly, spatial resolution and system cost are usually related to sampling rate in the prior art systems. For example, when the sampling rate is increased in a particular prior art system, either the cost of the system increases or the spatial resolution decreases.

To account for the trade-off between sampling rate, spatial resolution, and cost, the prior art systems for measuring fluid perturbation may generate data representing only the topmost fluid point or some equivalent or average of fluid points. Moreover, the prior art systems use few individual sensors. This measuring system is not accurate enough to resolve complex nonlinear fluid phenomena, such as breaking waves. For example, neither the system of Wang nor the system of Richards is accurate enough to resolve breaking waves. Inaccurate measurements of breaking waves leads to errors in understanding coastal dynamics including under-prediction of wave forces on structures as well as underestimating near bed stresses on the sediment bed, which leads to unforeseen coastal erosion issues.

BRIEF SUMMARY OF THE INVENTION

One or more of the embodiments of the present invention provide sensors, systems, and methods for measuring fluid perturbation. One system for measuring fluid perturbation includes a sensor module, a data management system, a control system, and a user input device. The control system includes a control system data storage element.

In the system for measuring fluid perturbation, the sensor module is in bidirectional communication with the data management system. The data management system is in bidirectional communication with the control system. The control system is in communication with the user input device.

In operation, data representing fluid is converted into data representing fluid perturbation. The data representing fluid perturbation is displayed by the control system in a series of steps. First, the data representing fluid is generated and recorded on the sensor module. During generating and recording, the sensor module is partially submerged in a conductive fluid.

Then the sensor module transmits the data representing fluid to the data management system in response to the data management system transmitting data representing a record request. After the data management system receives the data representing fluid from the sensor module, the data management system operates on the received data representing fluid to convert the data representing fluid into the data representing fluid perturbation. Next, the data management system stores the data representing fluid perturbation. Then the data management system transmits the data representing fluid perturbation to the control system. After the control system receives the data representing fluid perturbation, the control system stores the data representing fluid perturbation and displays the data representing fluid perturbation.

BRIEF DESCRIPTION OF THE DRAWINGS

FIG. 3 illustrates an elevational view of the sensor module of FIG. 1.

FIG. 4A and FIG. 4B illustrate an elevational view of an alternative embodiment sensor module.

DETAILED DESCRIPTION OF THE INVENTION

Figure 1:
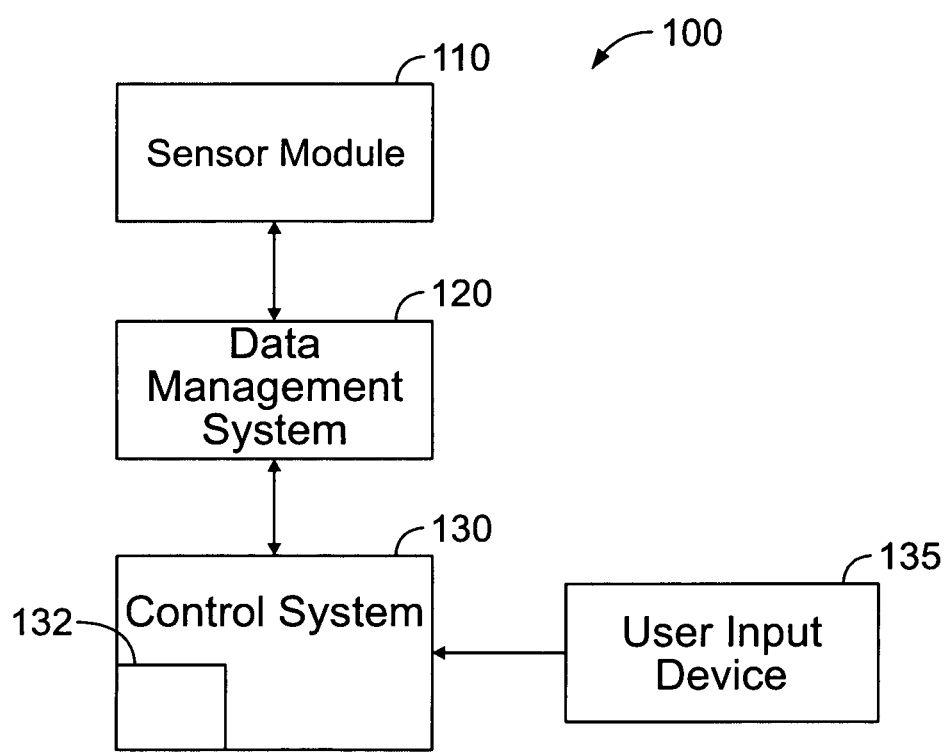
FIG. 1 illustrates a block diagram of a system for measuring fluid perturbation.

FIG. 1 illustrates a block diagram of a system for measuring fluid perturbation 100 according to an embodiment of the present invention. The system for measuring fluid perturbation 100 includes a sensor module 110, a data management system 120, a control system 130, and a user input device 135. The control system 130 includes a control system data storage element 132.

In the system for measuring fluid perturbation 100, the sensor module 110 is in bidirectional communication with the data management system 120. The data management system 120 is in bidirectional communication with the control system 130. The control system is in communication with the user input device 135.

In operation, data representing fluid, which is preferably data representing liquid level, is converted into data representing fluid perturbation. The data representing fluid perturbation is preferably data representing a wave height profile as further described below. The data representing fluid perturbation is displayed by the control system 130 in a series of steps. First, the data representing fluid is generated and recorded on sensor module 110 (as shown below in FIG. 3). During generating and recording data, the sensor module 110 is preferably partially submerged in a conductive fluid. The conductive fluid is preferably water.

Figure 9:
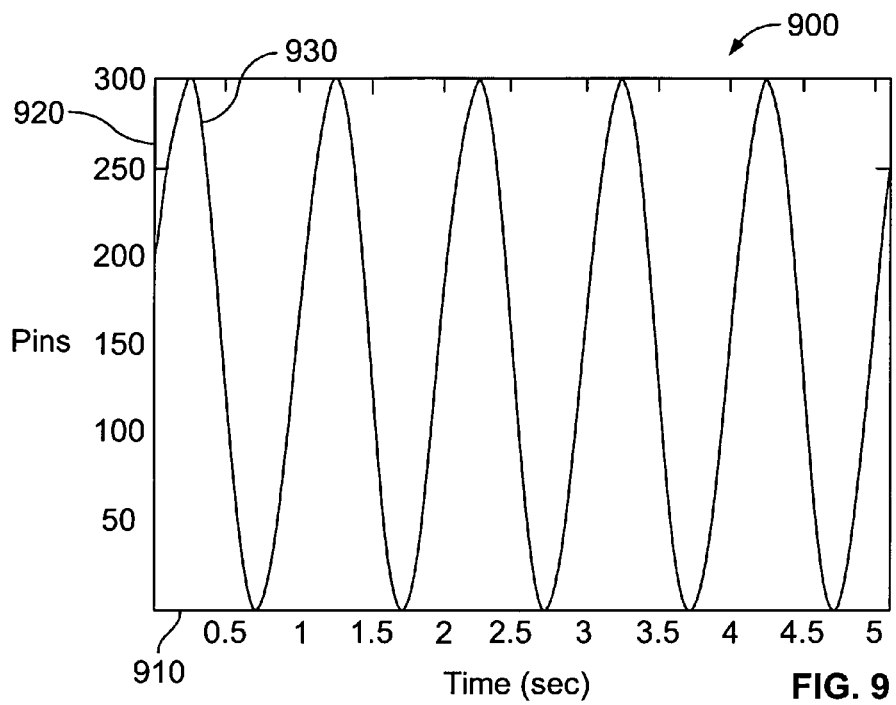
FIG. 9 illustrates a plan view of a first fluid perturbation display.
Figure 10:
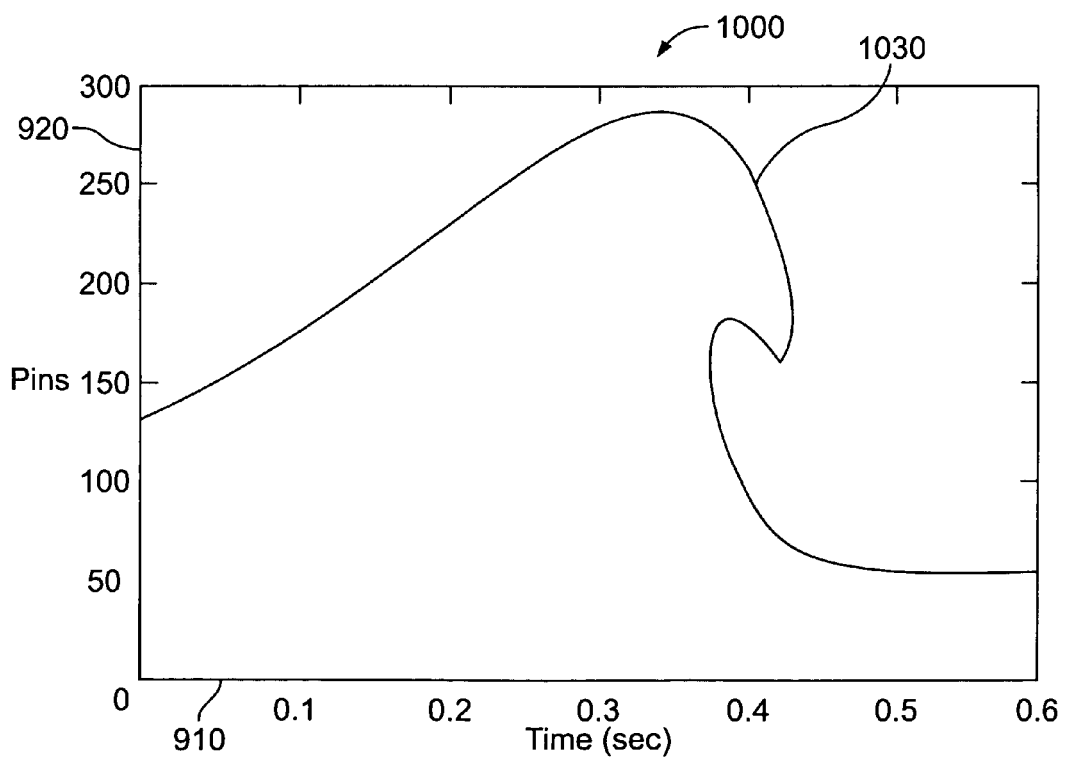
FIG. 10 illustrates a plan view of a second fluid perturbation display.
Figure 15:
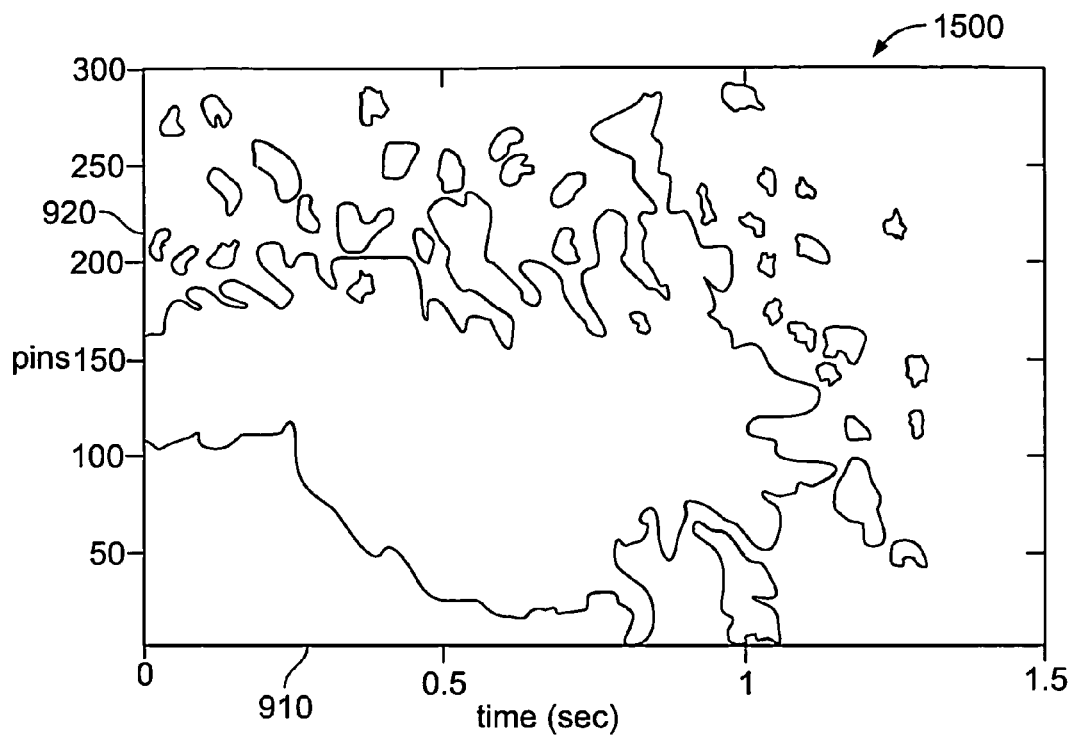
FIG. 15 illustrates a plan view of a third fluid perturbation display.

Then the sensor module 110 transmits the data representing fluid to the data management system 120 in response to the data management system 120 transmitting data representing a record request (as shown below in FIG. 5). After the data management system 120 receives the data representing fluid from the sensor module 110, the data management system 120 operates on the received data representing fluid to convert the data representing fluid into the data representing fluid perturbation. Next, the data management system 120 stores the data representing fluid perturbation. Then the data management system 120 transmits the data representing fluid perturbation to the control system 130, which is preferably a personal computer microprocessor. After the control system 130 receives the data representing fluid perturbation, the control system 130 stores the data representing fluid perturbation on the control system storage element 132 and displays the data representing fluid perturbation (as shown in FIG. 9, FIG. 10, and FIG. 15).

The data representing fluid perturbation may be data representing any wave profile. Accordingly, the data representing fluid perturbation may be data representing a linear wave or data representing a nonlinear wave, such as a breaking wave. The system for measuring fluid perturbation 100 is accurate enough to resolve complex nonlinear fluid phenomena such as breaking waves.

The conductive fluid that the sensor module 110 is preferably partially submerged in may be any fluid that conducts electricity. For example, the conductive fluid that the sensor module 110 is preferably partially submerged in may be salt water.

The user input device 135 is preferably a computer keyboard. The user input device 135 may also be any suitable user input device such as electronic push button switches, a touch screen display, or a mechanical rotating dial.

The control system storage element 132 is preferably physical memory. The control system storage element 132 may also be any computer-readable medium, including virtual memory, read-only memory (ROM), programmable read-only memory (EPROM), electronically-erasable programmable read-only memory (EEPROM), magnetic media, optical media, a soft disk, a hard disk, and any other type of secondary or tertiary memory.

In an alternative embodiment, the data management system 120 may transmit the data representing fluid perturbation to an alarm device (not shown). The alarm device, for example, may be a level alarm or a wave alarm. Accordingly, when the data representing fluid perturbation exceeds a predetermined threshold value, the alarm device generates an alarm.

In another embodiment, the control system 130 includes a personal computer with a software program.

In another embodiment, the user input device 135 is a software program that provides the system for measuring fluid perturbation 100 with automated input data.

Figure 2:
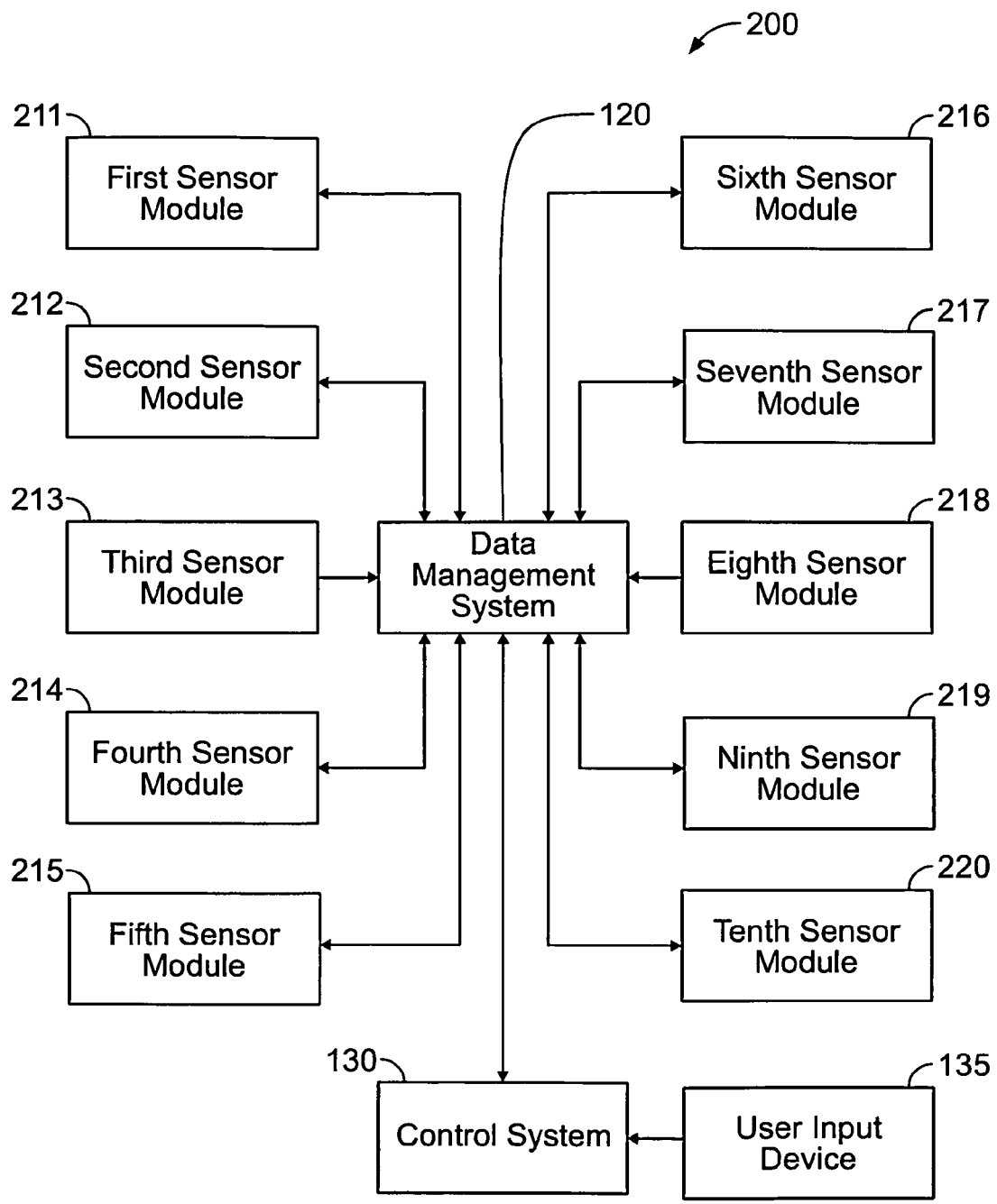
FIG. 2 illustrates a block diagram of an alternative embodiment system for measuring fluid perturbation.

FIG. 2 illustrates a block diagram of an alternative embodiment system for measuring fluid perturbation 200. Like the system for measuring fluid perturbation 100 of FIG. 1, the system for measuring fluid perturbation 200 includes the data management system 120 of FIG. 1, the control system 130 of FIG. 1, and the user input device 135 of FIG. 1.

Unlike the system for measuring fluid perturbation 100 of FIG. 1, which includes only the sensor module 110, the system for measuring fluid perturbation 200 includes a first sensor module 211, a second sensor module 212, a third sensor module 213, a fourth sensor module 214, a fifth sensor module 215, a sixth sensor module 216, a seventh sensor module 217, an eighth sensor module 218, a ninth sensor module 219, and a tenth sensor module 220.

In the system for measuring fluid perturbation 200, like the system for measuring fluid perturbation 100 of FIG. 1, the data management system 120 of FIG. 1 is in bidirectional communication with the control system 130 of FIG. 1. Additionally, the first sensor module 211 is in bidirectional communication with the data management system 120 of FIG. 1, the second sensor module 212 is in bidirectional communication with the data management system 120 of FIG. 1, the third sensor module 213 is in bidirectional communication with the data management system 120 of FIG. 1, the fourth sensor module 214 is in bidirectional communication with the data management system 120 of FIG. 1, the fifth sensor module 215 is in bidirectional communication with the data management system 120 of FIG. 1, the sixth sensor module 216 is in bidirectional communication with the data management system 120 of FIG. 1, the seventh sensor module 217 is in bidirectional communication with the data management system 120 of FIG. 1, the eighth sensor module 218 is in bidirectional communication with the data management system 120 of FIG. 1, the ninth sensor module 219 is in bidirectional communication with the data management system 120 of FIG. 1, and the tenth sensor module 220 is in bidirectional communication with the data management system 120 of FIG. 1.

In operation, the system for measuring fluid perturbation 200 functions similarly to the system for measuring fluid perturbation 100 of FIG. 1 as described above except that the system for measuring fluid perturbation 200 adds additional functionality as described below. Because the system for measuring fluid perturbation 200 has more sensor modules than the system for measuring fluid perturbation 100, the system for measuring fluid perturbation 200 has a greater data resolution than the system for measuring fluid perturbation 100.

The number of sensor modules in the system for measuring fluid perturbation 200 may be increased to further increase data resolution. For example, in an alternative embodiment, the system for measuring fluid perturbation 200 has twenty sensor modules. In this alternative embodiment, each of the sensor modules is in bidirectional communication with the data management system 120 of FIG. 1.

In another embodiment, the system for measuring fluid perturbation 200 has 1,000 sensor modules. In this alternative embodiment, each of the sensor modules is in bidirectional communication with the data management system of 120 of FIG. 1.

FIG. 3 illustrates an elevational view of the sensor module 110 of FIG. 1. The sensor module 110 of FIG. 1 includes a horizontal axis 320, a vertical axis 330, a sensor module microprocessor 340, a first sensor 350, and a second sensor 360.

In the sensor module 110 of FIG. 1, the horizontal axis 320 is affixed to the vertical axis 330. Moreover, the vertical axis 330 is perpendicular to the horizontal axis 320. The first sensor 350 is laterally offset from the horizontal axis 320. The second sensor 360 is laterally offset from the vertical axis 330. The first sensor 350 is vertically offset from the second sensor 360, and the first sensor 350 is horizontally offset from the second sensor 360. The first sensor 350 is electrically connected to the sensor module microprocessor 340. The second sensor 360 is electrically connected to the sensor module microprocessor 340. The first sensor 350 and second sensor 360 are preferably offset from each other by no more than 850 micrometers. As described above, the sensor module 110 of FIG. 1 is in bidirectional communication with the data management system 120 of FIG. 1.

In operation, the sensor module 110 of FIG. 1 generates and records data representing fluid in a series of steps. First, the first sensor 350 generates a first data value representing fluid, and the second sensor 360 generates a second data value representing fluid. The first data value representing fluid generated by the first sensor 350 preferably may optionally be logic low or logic high. When the first sensor detects a fluid, the first data value representing fluid generated by the first sensor 350 is preferably logic low. When the first sensor 350 does not recognize the fluid, the first data value representing fluid generated by the first sensor 350 is preferably logic high.

The second data value representing fluid generated by the second sensor 360 preferably may optionally be logic low or logic high. When the second sensor 360 detects a fluid, the second data value representing fluid generated by the second sensor 360 is preferably logic low. When the second sensor 360 does not recognize the fluid, the second data value representing fluid generated by the second sensor 360 is preferably logic high.

When the sensor module microprocessor 340, which is preferably a complex programmable logic device (CPLD), receives data representing a record request from the data management system 120 of FIG. 1, the sensor module microprocessor 340 reads the first data value representing fluid generated by the first sensor 350 and reads the second data value representing fluid generated by the second sensor 360. The sensor module microprocessor 340 preferably reads the first data value representing fluid by the first sensor 350 and reads the second data value representing fluid generated by the second sensor 360 simultaneously. When the first sensor 350 recognizes the fluid, the first data value representing fluid, which is preferably logic low, is preferably read as a "0" by the sensor module microprocessor 340. When the second sensor 360 does not recognize the fluid, the second data value representing fluid, which is preferably logic high, is preferably read as a "1" by the sensor module microprocessor 340.

Next, the sensor module microprocessor 340 records the first data value representing fluid generated by the first sensor 350 and records the second data value representing fluid generated by the second sensor 360. When the first sensor 350 recognizes the fluid, the first data value representing fluid, which is preferably logic low, is preferably recorded as a "0" by the sensor module microprocessor 340. When the second sensor 360 does not recognize the fluid, the second data value representing fluid, which is preferably logic high, is preferably recorded as a "1" by the sensor module microprocessor 340. The sensor module microprocessor 340 preferably records the first data value representing fluid generated by the first sensor 350 and records the second data value representing fluid generated by the second sensor simultaneously. The sensor module microprocessor 340 preferably records the first data value representing fluid generated by the first sensor 350 and records the second data value representing fluid generated by the second sensor on the order of nanoseconds.

Then the sensor module microprocessor 340 transmits the data representing fluid to the data management system 120 of FIG. 1. The data representing fluid is preferably a data string representing the first data value representing fluid generated by the first sensor 350 and the second data value representing fluid generated by the second sensor 360 that were recorded by the sensor module microprocessor 340. When the first sensor 350 recognizes the fluid and when the second sensor 360 does not recognize the fluid, the data string representing the first data value representing fluid generated by the first sensor 350 and the second data value representing fluid generated by the second sensor 360 that were recorded by the sensor module microprocessor 340 is preferably "01."

In another embodiment, when the first sensor 350 recognizes the fluid, the first data value representing fluid generated by the first sensor 350 is preferably logic high. In this embodiment, when the first sensor 350 does not recognize the fluid, the first data value representing fluid generated by the first sensor 350 is preferably logic low. Moreover, when the second sensor 360 recognizes the fluid, the second data value representing fluid generated by the second sensor 360 is preferably logic high. In this embodiment, when the second sensor 360 does not recognize the fluid, the second data value representing fluid generated by the second sensor 360 is preferably logic low.

The first data value representing fluid generated by the first sensor 350 and the second data value representing fluid generated by the second sensor 360 may be equal depending on fluid conditions. Accordingly, the data string representing the first data value representing fluid generated by the first sensor 350 and the second data value representing fluid generated by the second sensor 360 that were recorded by the sensor module microprocessor 340 may optionally be "00" or "11."

Further still, the first data value representing fluid generated by the first sensor 350 and the second data value representing fluid generated by the second sensor 360 may vary over time depending on fluid conditions.

The spatial resolution of the sensor module 110 of FIG. 3 is preferably 850 micrometers. Alternatively, the spatial resolution may range from 100 to 1,000 micrometers. In another embodiment, the spatial resolution may be anywhere on the micrometer scale or millimeter scale.

In an alternative embodiment, the first sensor 350 is not horizontally offset from the second sensor 360. The first sensor 350 and the second sensor 360 are located on an axis perpendicular to the vertical axis 330. In this embodiment, the first sensor 350 is vertically offset from the second sensor 360.

Figure 4B:
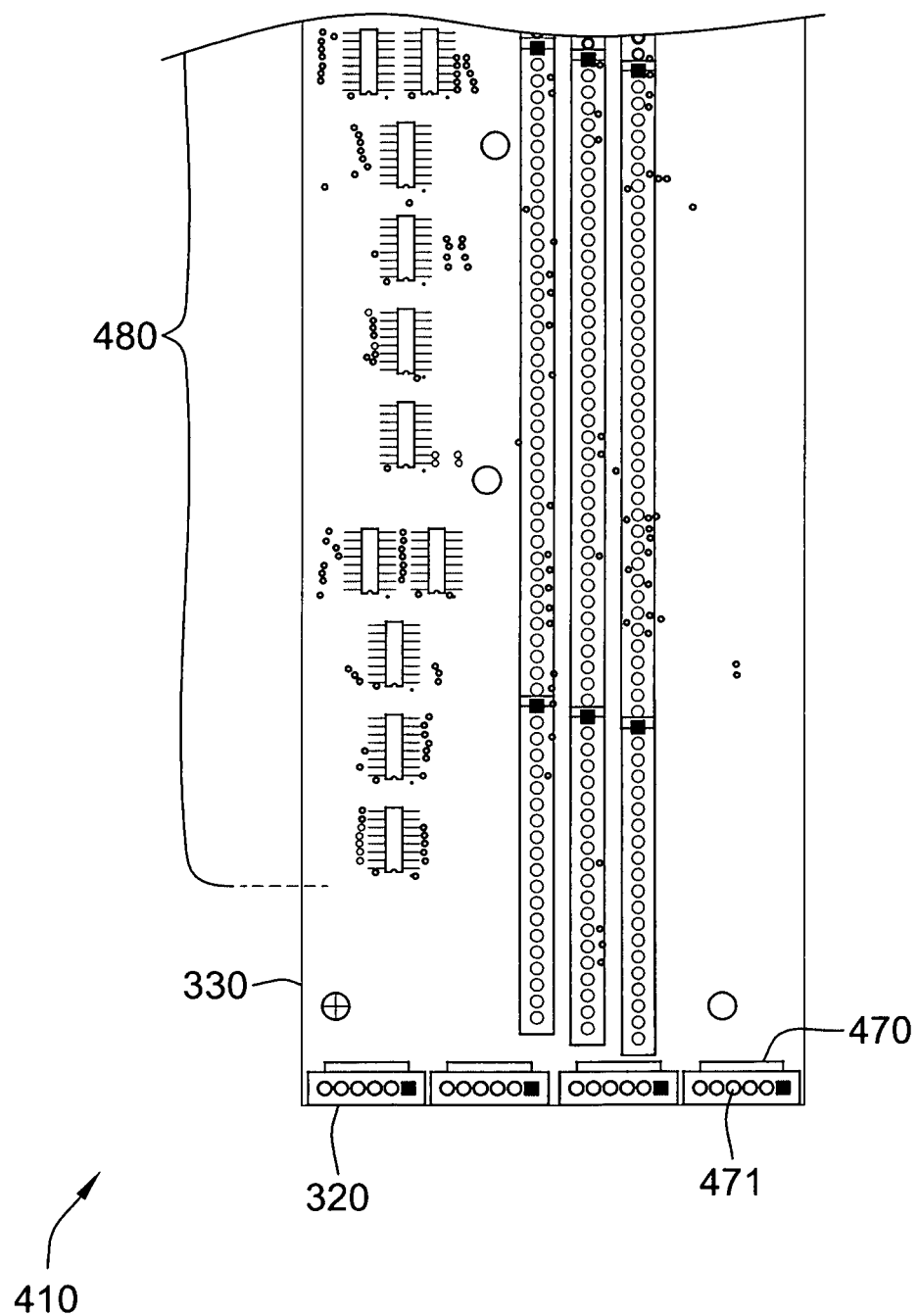

FIG. 4A illustrates an elevational view of the top-half of an alternative embodiment sensor module 410. FIG. 4B illustrates an elevational view of the bottom-half of the sensor module 410. Sensor module 410 includes the horizontal axis 320 of FIG. 3, the vertical axis 330 of FIG. 3, a first sensor module microprocessor 440, a second sensor microprocessor 445, a sensing pin array 450, a grounding pin row 470, a resistor row 480, and a connector 490. The sensing pin array 450 includes a sensing pin 451. The grounding pin row includes a grounding pin 471. The resistor row 480 includes a resistor 481.

In the sensor module 410, the horizontal axis 320 of FIG. 3 is affixed to the vertical axis 330 of FIG. 3. The first sensor module microprocessor 440 is electrically connected to the sensing pin array 450. The second sensor module microprocessor 445 is electrically connected to the sensing pin array 450. The sensing pin array 450 is electrically connected to the resistor row 480. When a conductive fluid contacts both the sensing pin array 450 and the grounding pin row 470, the sensing pin array 450 is electrically connected to the grounding pin row 470. The grounding pin row 470 is electrically connected to earth ground. The grounding pin row 470 is affixed to the horizontal axis 320 of FIG. 3. The first sensor module microprocessor 440 is electrically connected to the connector 490. The second sensor module microprocessor 445 is electrically connected to the connector 490. The connector 490 is in bidirectional communication with the data management system 120 of FIG. 1.

In the sensor module 410, the first sensor module 440 is electrically connected to the sensing pin 451 of the sensing pin array 450. The sensing pin 451 of the sensing pin array 450 is electrically connected to the resistor 481 of the resistor row 480. The sensing pin 451 of the sensing pin array 450 is electrically connected to the grounding pin 471 of the grounding pin row 470.

In operation, the sensor module 410, which is preferably partially submerged in a conductive fluid, generates data representing fluid. The sensing pin 451 of the sensing pin array 450 forms an electrical circuit with the grounding pin 471 of the grounding pin row 470 and the resistor 481 of the resistor row 480. In another embodiment of the invention, the sensing pin 451 and/or grounding pin 471 in sensor array 450 are gold plated. The resistor 481 of the resistor row 480 is preferably a pull up resistor. When the conductive fluid does not contact both the grounding pin 471 of the grounding pin row 470 and the sensing pin 451 of the sensing pin array 450, the sensing pin 451 of the sensing pin array 450 generates a first data value representing fluid, which is preferably logic high. When the conductive fluid contacts both the grounding pin 471 of the ground pin row 470 and the sensing pin 451 of the sensing pin array 450, the sensing pin 451 of the sensing pin array 450 generates a second data value representing fluid, which is preferably logic low.

The sensing pin array 450 preferably includes 300 sensing pins with similar connections and similar functionality to the sensing pin 451 of the sensing pin array 450. For example, 150 sensing pins of the sensing pin array 451 are preferably connected to the first sensor module microprocessor 440, and 150 sensing pins of the sensing pin array 450 are preferably connected to the second sensor module microprocessor 445. The 300 sensing pins are preferably located in a three by one hundred grid. Horizontally adjacent pins are preferably spaced about 850 micrometers apart. Vertically adjacent pins are preferably spaced about 850 micrometers apart.

The sensor module 410 reads and records the data representing fluid in a series of steps. First, when the connector 490 receives data representing a record request from the data management system 120 of FIG. 1, the connector 490 transmits the data representing a record request to the first sensor module microprocessor 440, which is preferably a CPLD. Inc., N.Y. In another embodiment of the invention, connector 490 is preferably water-proof. Like the first sensor module microprocessor 440, the second sensor module microprocessor 445 is preferably a CPLD. Next, the first sensor module microprocessor 440 records the data representing fluid generated by the sensing pin 451 of the sensing pin array 450. The first sensor module microprocessor 440 preferably records the data representing fluid by reading a data value representing fluid generated by the sensing pin 451 of the sensing pin array 450. The first sensor module microprocessor 440 preferably reads logic high as "1" and logic low as "0." The first sensor module microprocessor 440 preferably records the data representing fluid generated by the sensing pin 451 of the sensing pin array 450 on the order of nanoseconds. Then the first sensor module microprocessor 440 transmits the data representing fluid to the connector 490. The data representing fluid is preferably a data string representing the data value representing fluid generated by the sensing pin 451 of the sensing pin array 450.

As described above, the sensing pin array 450 preferably includes 300 sensing pins with similar connections and similar functionality to the sensing pin 451 of the sensing pin array 450. Accordingly, the data string preferably represents the data values representing fluid generated by all of the 300 sensing pins of sensing pin array 450.

The sensor module 410 transmits the data representing fluid in a series of steps. First, the first sensor module microprocessor 440 transmits the data representing fluid to the connector 490. Then the connector 490 transmits the data representing fluid to the data management system 120 of FIG. 1.

As described above, the sensor module 410 is preferably partially submerged in the conductive fluid. The sensor module is preferably coated with epoxy to prevent the fluid from damaging the sensor module 410. The epoxy is preferably applied to the sensor module 410 such that the tip of the sensing pin 451 of the sensing pin array 450 and the connector 490 preferably remain exposed to the fluid.

The resistance value of the resistor row 480 may be adjusted to measure different fluids. The spatial resolution of the sensor module 410 of FIG. 4A is preferably 850 micrometers. Alternatively, the spatial resolution may be 100 to 1,000 micrometers. In another embodiment, the spatial resolution may be anywhere on the micrometer scale or millimeter scale.

In an alternative embodiment, the sensing pin array 450 includes 100 sensing pins that are preferably located along an axis perpendicular to the vertical axis 320 of FIG. 3. In this embodiment, adjacent pins are vertically offset from each other by preferably 850 micrometers.

Figure 5:
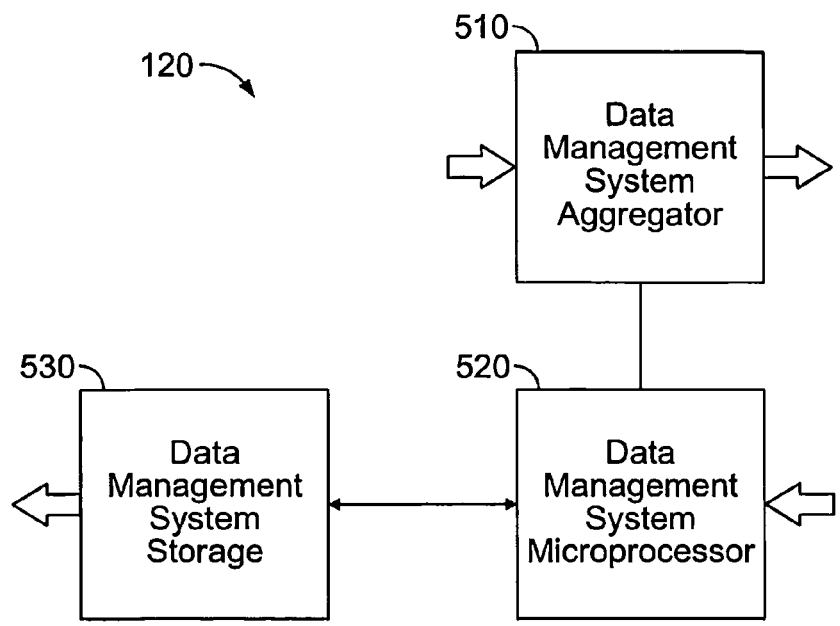
FIG. 5 illustrates a block diagram of the data management system of FIG. 1.

FIG. 5 illustrates a block diagram of the data management system 120 of FIG. 1. The data management system 120 of FIG. 1 includes a data management system microprocessor 510, a data management system aggregator 520, and a data management system storage 530.

In the data management system 120 of FIG. 1, the data management system microprocessor 510 is in communication with the sensor module 110 of FIG. 1. The data management system microprocessor 510 is in communication with the control system 130 of FIG. 1. The data management system microprocessor 510 is electrically coupled to the data management system aggregator 520. The data management system aggregator 520 is in communication with the sensor module 110 of FIG. 1. The data management system aggregator 520 is in bidirectional communication with the data management system storage 530. The data management system storage 530 is in communication with the control system 130 of FIG. 1.

In operation, the data management system 120 of FIG. 1 preferably has four functions: transmitting data representing a record request to the sensor module 110 of FIG. 1, converting data representing fluid into data representing fluid perturbation, storing the data representing fluid perturbation, and transmitting the data representing fluid perturbation to the control system 130 of FIG. 1. The four functions preferably comprise one data capture cycle.

The data management system 120 of FIG. 1 transmits data representing a record request to the sensor module 110 of FIG. 1 in a series of steps. First, a user inputs data representing a record request time using the user input device 135 of FIG. 1. The record request time is preferably the time that elapses before the data management system 120 transmits data representing a record request. The record request frequency is preferably a maximum of 1 kilohertz.

After the user inputs data representing a record request time using the control system 130 of FIG. 1, the user input device 135 transmits the data representing a record request time to the control system 130 of FIG. 1. Then the control system of FIG. 1 transmits the data representing a record request time to the data management system microprocessor 510. The data management system microprocessor 510 is preferably a field programmable gate array (FPGA). When the record request time elapses, the data management system microprocessor 510 transmits data representing a record request to the sensor module 110 of FIG. 1. The data representing a record request is preferably an update pulse.

The sensor module 110 of FIG. 1 preferably transmits the data representing fluid to the data management system aggregator 520 in response to receiving data representing a record request from the data management system microprocessor 510. The data representing fluid is preferably transmitted to the data management system aggregator 520 serially. When the data management system aggregator 520 receives the data representing fluid from the sensor module 110 of FIG. 1, the data management system aggregator 520 converts the data representing fluid into the data representing fluid perturbation. In another embodiment of the invention, the data management system aggregator 520 is preferably dual-port RAM.

Next, the data management system aggregator 520 transmits the data representing fluid perturbation to the data management system storage 530, preferably via a universal serial bus (USB). When the data management system storage 530 receives the data representing fluid perturbation from the data management system aggregator 520, the data management system storage 530 stores the data representing fluid perturbation. After the data management system storage 530 stores the data representing fluid perturbation, the data management system storage 530 transmits the data representing fluid perturbation to the control system 130 of FIG. 1.

The data management system 120 may perform more than one data capture cycle. In such an embodiment, the data management system 120 of FIG. 1 begins a data capture cycle after the record request time has elapsed. As described above, one data capture cycle preferably comprises transmitting data representing a record request to the sensor module 110 of FIG. 1, converting the data representing fluid into the data representing fluid perturbation, storing the data representing fluid perturbation, and transmitting the data representing fluid perturbation to the control system 130 of FIG. 1.

The data management system storage 530 may also be any digital communication bus including serial RS232, RS485, and Ethernet in all forms wired and wireless.

As shown in FIG. 2, the data management system 120 of FIG. 1 may be part of the system for measuring fluid perturbation 200 of FIG. 2. In this embodiment, the data management system microprocessor 510 is in communication with the first sensor module 211 of FIG. 2, the second sensor module 212 of FIG. 2, the third sensor module 213 of FIG. 2, the fourth sensor module 214 of FIG. 2, the fifth sensor module 215 of FIG. 2, the sixth sensor module 216 of FIG. 2, the seventh sensor module 217 of FIG. 2, the eighth sensor module 218 of FIG. 2, the ninth sensor module 219 of FIG. 2, and the tenth sensor module 220 of FIG. 2.

In this embodiment, the data management system aggregator 520 is in communication with the first sensor module 211 of FIG. 2, the second sensor module 212 of FIG. 2, the third sensor module 213 of FIG. 2, the fourth sensor module 214 of FIG. 2, the fifth sensor module 215 of FIG. 2, the sixth sensor module 216 of FIG. 2, the seventh sensor module 217 of FIG. 2, the eighth sensor module 218 of FIG. 2, the ninth sensor module 219 of FIG. 2, and the tenth sensor module 220 of FIG. 2.

In operation, the data management system 120 of FIG. 1 when included in the system for measuring fluid perturbation 200 of FIG. 2 functions similarly to the data management system 120 of FIG. 1 when included in the system for measuring fluid perturbation 100 of FIG. 1.

After the user inputs the data representing a record request time using the user input device 135 of FIG. 1, the user input device 135 of FIG. 1 transmits the data representing a record request time to the data management system microprocessor 510. The data management system microprocessor 510 is preferably a FPGA. When the record request time elapses, the data management system microprocessor 510 transmits the data representing a record request to the first sensor module 211 of FIG. 2, the second sensor module 212 of FIG. 2, the third sensor module 213 of FIG. 2, the fourth sensor module 214 of FIG. 2, the fifth sensor module 215 of FIG. 2, the sixth sensor module 216 of FIG. 2, the seventh sensor module 217 of FIG. 2, the eighth sensor module 218 of FIG. 2, the ninth sensor module 219 of FIG. 2, and the tenth sensor module 220 of FIG. 2. The data management system microprocessor 510 preferably transmits the data representing a record request simultaneously to the first sensor module 211 of FIG. 2, the second sensor module 212 of FIG. 2, the third sensor module 213 of FIG. 2, the fourth sensor module 214 of FIG. 2, the fifth sensor module 215 of FIG. 2, the sixth sensor module 216 of FIG. 2, the seventh sensor module 217 of FIG. 2, the eighth sensor module 218 of FIG. 2, the ninth sensor module 219 of FIG. 2, and the tenth sensor module 220 of FIG. 2. The data representing a record request is preferably an update pulse.

The first sensor module 211 of FIG. 2, the second sensor module 212 of FIG. 2, the third sensor module 213 of FIG. 2, the fourth sensor module 214 of FIG. 2, the fifth sensor module 215 of FIG. 2, the sixth sensor module 216 of FIG. 2, the seventh sensor module 217 of FIG. 2, the eighth sensor module 218 of FIG. 2, the ninth sensor module 219 of FIG. 2, and the tenth sensor module 220 of FIG. 2 preferably simultaneously transmit the data representing fluid to the data management system aggregator 520 in response to receiving the data representing a record request from the data management system microprocessor 510. The data representing fluid is preferably transmitted to the data management system aggregator 520 serially. When the data management system aggregator 520, which is preferably dual-port RAM, receives the data representing fluid from the first sensor module 211 of FIG. 2, the second sensor module 212 of FIG. 2, the third sensor module 213 of FIG. 2, the fourth sensor module 214 of FIG. 2, the fifth sensor module 215 of FIG. 2, the sixth sensor module 216 of FIG. 2, the seventh sensor module 217 of FIG. 2, the eighth sensor module 218 of FIG. 2, the ninth sensor module 219 of FIG. 2, and the tenth sensor module 220 of FIG. 2, the data management system aggregator 520 converts the data representing fluid into the data representing fluid perturbation. The data management system aggregator 520 preferably converts the data representing fluid into the data representing fluid perturbation by recording the data representing fluid received from the first sensor module 211 of FIG. 2, the second sensor module 212 of FIG. 2, the third sensor module 213 of FIG. 2, the fourth sensor module 214 of FIG. 2, the fifth sensor module 215 of FIG. 2, the sixth sensor module 216 of FIG. 2, the seventh sensor module 217 of FIG. 2, the eighth sensor module 218 of FIG. 2, the ninth sensor module 219 of FIG. 2, and the tenth sensor module 220 of FIG. 2.

Next, the data management system aggregator 520 transmits the data representing fluid perturbation to the data management system storage 530, preferably via a USB. When the data management system storage 530 receives data representing fluid perturbation from the data management system aggregator 520, the data management system storage 530 stores the data representing fluid perturbation. After the data management system storage 530 stores the data representing fluid perturbation, the data management system storage 530 transmits the data representing fluid perturbation to the control system 130 of FIG. 1.

In another embodiment, the first sensor module 211 of FIG. 2 is the sensor module 410 of FIG. 4A with a sensing pin array 450 that includes 300 sensing pins, the second sensor module 212 of FIG. 2 is the sensor module 410 of FIG. 4A with a sensing pin array 450 that includes 300 sensing pins, the third sensor module 213 of FIG. 2 is the sensor module 410 of FIG. 4A with a sensing pin array 450 that includes 300 sensing pins, the fourth sensor module 214 of FIG. 2 is the sensor module 410 of FIG. 4A with a sensing pin array 450 that includes 300 sensing pins, the fifth sensor module 215 of FIG. 2 is the sensor module 410 of FIG. 4A with a sensing pin array 450 that includes 300 sensing pins, the sixth sensor module 216 of FIG. 2 is the sensor module 410 of FIG. 4A with a sensing pin array 450 that includes 300 sensing pins, the seventh sensor module 217 of FIG. 2 is the sensor module 410 of FIG. 4A with a sensing pin array 450 that includes 300 sensing pins, the eighth sensor module 218 of FIG. 2 is the sensor module 410 of FIG. 4A with a sensing pin array 450 that includes 300 sensing pins, the ninth sensor module 219 of FIG. 2 is the sensor module 410 of FIG. 4A with a sensing pin array 450 that includes 300 sensing pins, and the tenth sensor module 220 of FIG. 2 is the sensor module 410 of FIG. 4A with a sensing pin array 450 that includes 300 sensing pins.

In this embodiment, when the data management system aggregator 520, which is preferably dual-port RAM, receives the data representing fluid from the first sensor module 211 of FIG. 2, the second sensor module 212 of FIG. 2, the third sensor module 213 of FIG. 2, the fourth sensor module 214 of FIG. 2, the fifth sensor module 215 of FIG. 2, the sixth sensor module 216 of FIG. 2, the seventh sensor module 217 of FIG. 2, the eighth sensor module 218 of FIG. 2, the ninth sensor module 219 of FIG. 2, and the tenth sensor module 220 of FIG. 2, the data management system aggregator 520 converts the data representing fluid into data representing fluid perturbation. The data management system aggregator 520 preferably converts the data representing fluid into data representing fluid perturbation by recording the data representing fluid received from the first sensor module 211 of FIG. 2, the second sensor module 212 of FIG. 2, the third sensor module 213 of FIG. 2, the fourth sensor module 214 of FIG. 2, the fifth sensor module 215 of FIG. 2, the sixth sensor module 216 of FIG. 2, the seventh sensor module 217 of FIG. 2, the eighth sensor module 218 of FIG. 2, the ninth sensor module 219 of FIG. 2, and the tenth sensor module 220 of FIG. 2. In this embodiment, the data representing fluid perturbation represents 3,000 data values representing fluid.

Next, the data management system aggregator 520 transmits the data representing fluid perturbation to the data management system storage 530, preferably via a USB. When the data management system storage 530 receives the data representing fluid perturbation from the data management system aggregator 520, the data management system storage 530 stores the data representing fluid perturbation. After the data management system storage 530 stores the data representing fluid perturbation, the data management system storage 530 transmits the data representing fluid perturbation to the control system 130 of FIG. 1.

In this embodiment, the record request time is preferably one millisecond. The time that elapses between the data management system aggregator 520 receiving the data representing fluid from the first sensor module 211 of FIG. 2, the second sensor module 212 of FIG. 2, the third sensor module 213 of FIG. 2, the fourth sensor module 214 of FIG. 2, the fifth sensor module 215 of FIG. 2, the sixth sensor module 216 of FIG. 2, the seventh sensor module 217 of FIG. 2, the eighth sensor module 218 of FIG. 2, the ninth sensor module 219 of FIG. 2, and the tenth sensor module 220 of FIG. 2 and the data aggregator 520 converting the data representing fluid to data representing fluid perturbation is preferably 300 microseconds. The time that elapses between the data management system storage 530 storing the data representing fluid perturbation is preferably less than 700 microseconds.

The number of sensor modules in the system for measuring fluid perturbation 200 may be increased to further increase data resolution. For example, in another embodiment, the system for measuring fluid perturbation 200 has 1,000 sensor modules. In this embodiment, each sensor module is sensor module 410 of FIG. 4A with a sensing pin array 450 that includes 300 sensing pins. Accordingly, in this embodiment, the data representing fluid perturbation represents 300,000 data values representing fluid.

The number of sensor modules in the system for measuring fluid perturbation 200 may be either increased or decreased to measure fluid perturbation in a particular environment including tanks in research laboratories and tanks in industrial settings in addition to various field applications.

Figure 6:
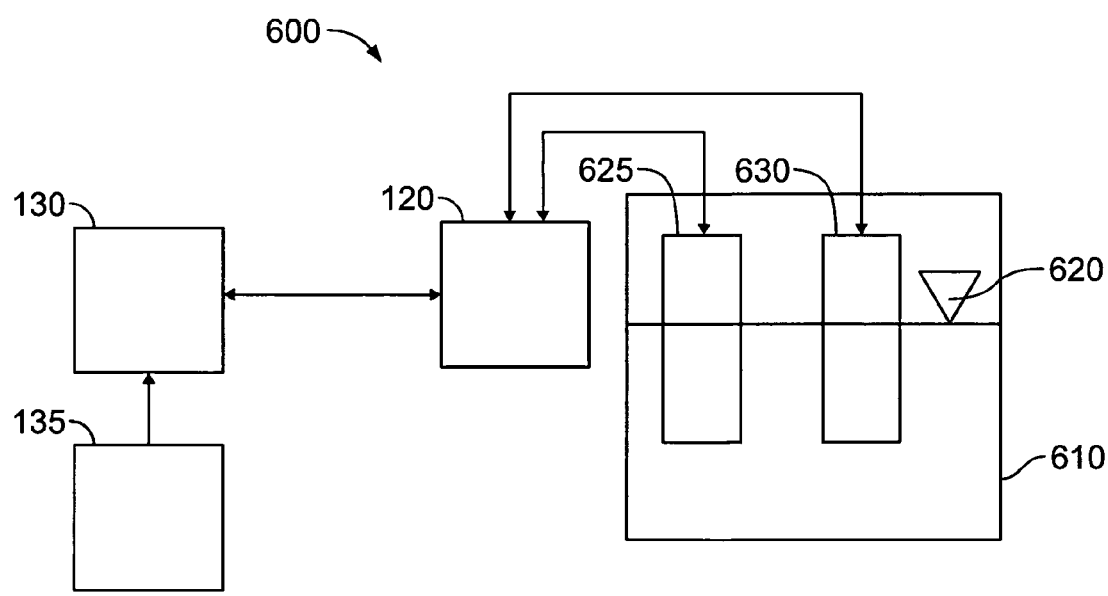
FIG. 6 illustrates a block diagram of a system for measuring fluid perturbation.

FIG. 6 illustrates a block diagram of a system for measuring fluid perturbation 600. The system for measuring fluid perturbation 600 includes a tank 610, a tank liquid level 620, a first sensor probe 625, a second sensor probe 630, the data management system 120 of FIG. 1, the control system 130 of FIG. 1, and the user input device 135 of FIG. 1.

In the system for measuring fluid perturbation 600, the first sensor probe 625 and the second sensor probe 630 are suspended in tank 610. The first sensor probe 625 and the second sensor probe 630 are preferably submerged in the tank partially below the tank liquid level 620. The first sensor probe 625 is preferably horizontally offset from the second sensor probe 630 in the tank 610 by a predetermined distance.

The first sensor probe 625 is electrically connected to the data management system 120 of FIG. 1. The second sensor probe 630 is electrically connected to the data management system 120 of FIG. 1. The data management system 120 of FIG. 1 is electrically connected to the control system 130 of FIG. 1. The control system 130 of FIG. 1 is electrically connected to the user input device 135 of FIG. 1.

In operation, the tank liquid level 620 preferably varies over time due to fluid flow. The first sensor probe 625 and the second sensor probe 630 are preferably located in the tank 610 parallel to the fluid flow. The first sensor probe 625 and the second sensor probe 630 are preferably the sensor module 410 of FIG. 4A with a sensing pin array 450 that includes 300 sensing pins.

In operation, the system for measuring fluid perturbation 600 functions similarly to the system for measuring fluid perturbation 200 as described above.

The first sensor probe 625 and the second sensor probe 630 are preferably located against the inside wall of the tank 610 parallel to the fluid flow to lessen any flow resistance created by the first sensor probe 625 and the second sensor probe 630. In an alternative embodiment, the first sensor probe 625 and the second sensor probe 630 are located in the tank 610 perpendicular to the fluid flow.

The system for measuring fluid perturbation 600 may be used to measure fluid perturbation during filling of tank 610. Moreover, the system for measuring fluid perturbation may be used to measure fluid perturbation during draining of tank 610.

Further still, the system for measuring fluid perturbation 600 may be used to measure local-wise wave celerity and reach-wise wave celerity. Local-wise wave celerity is preferably measured using one sensing pin of optionally the first sensor probe 625 or the second sensor probe 630. Reach-wise wave celerity is preferably measured using the first sensor probe 625 and the second sensor probe 635. The reach-wise wave celerity may also be measured using two sensing pins of optionally the first sensor probe 625 or the second sensor probe 630.

The system for measuring fluid perturbation 600 may also be used to measure attenuation of waves through vegetation or sediment formations.

The system for measuring fluid perturbation 600 may be used in a variety of environments including tanks in research laboratories and tanks in industrial settings in addition to various field applications.

In another embodiment, the first sensor probe 625 is vertically offset from the second sensor probe 630 in the tank 610 by a predetermined distance. In another embodiment, the first sensor probe 625 is horizontally offset from the second sensor probe 630 in the tank 610 by a predetermined distance and vertically offset from the second sensor probe 630 in the tank 610 by a predetermined distance.

In yet another embodiment, the first sensor probe 625 is the sensor module 110 of FIG. 3 and the second sensor probe 630 is the sensor module 110 of FIG. 3.

Figure 7:
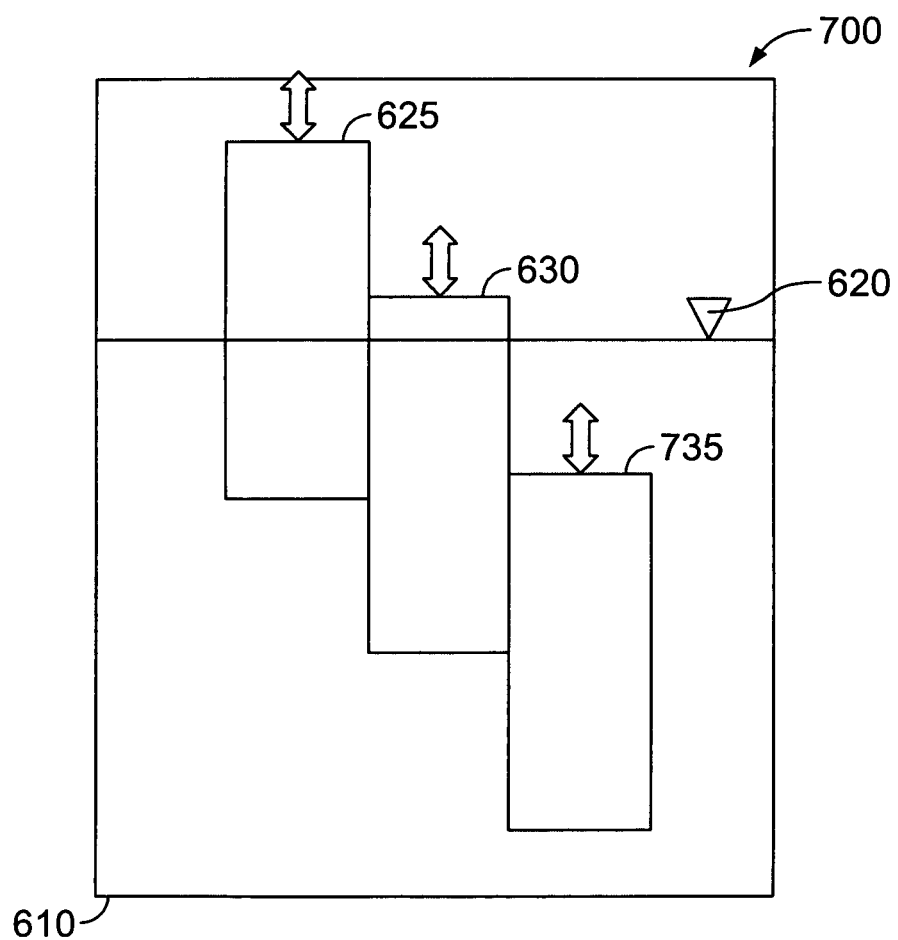
FIG. 7 illustrates a partial elevational view of an alternative embodiment system for measuring fluid perturbation.

FIG. 7 illustrates a partial elevational view of an alternative embodiment of the system for measuring fluid perturbation 700. Like the system for measuring fluid perturbation 600 of FIG. 6, the system for measuring fluid perturbation 700 includes the tank 610 of FIG. 6, the liquid level 620 of FIG. 6, the first sensor probe 625 of FIG. 6, the second sensor probe 630 of FIG. 6, the data management system 120 of FIG. 1 (not shown), the control system 130 of FIG. 1 (not shown), and the user input device 135 of FIG. 1 (not shown). Unlike the system for measuring fluid perturbation 600 of FIG. 6, the system for measuring fluid perturbation 700 includes a third sensor probe 735, which is preferably the sensor module 410 of FIG. 4A with the sensing pin array 450 that includes 300 sensing pins.

In the system for measuring fluid perturbation 700, the connections described above for the system for measuring fluid perturbation 600 of FIG. 6 exist. Additionally, the third sensor probe is electrically connected to the data management system 120 of FIG. 1 (not shown). In the system for measuring fluid perturbation 700, the first sensor probe 625 of FIG. 6 is mechanically connected to the second sensor probe 630 of FIG. 6. In this connection, the first sensor probe 625 of FIG. 6 is preferably vertically offset from the second sensor probe 630 of FIG. 6. The second sensor probe 630 of FIG. 6 is mechanically connected to the third sensor probe 735. In this connection, the second sensor probe 630 of FIG. 6 is preferably vertically offset from the third sensor probe 735. The first sensor probe 625 of FIG. 6, the second probe of FIG. 6, and the third sensor probe 735 are preferably located against the wall of tank 610 of FIG. 6 parallel to the fluid flow to lessen any flow resistance created by the first sensor probe 625 of FIG. 6, the second probe of FIG. 6, and the third sensor probe 735.

In operation, the system for measuring fluid perturbation 700 functions similarly to the system for measuring fluid perturbation 600 as described above.

The connection of first sensor probe 625 of FIG. 6, the second sensor probe 630 of FIG. 6, and the third sensor probe 735 preferably increases the vertical dynamic range of the system for measuring fluid perturbation 700.

Figure 8:
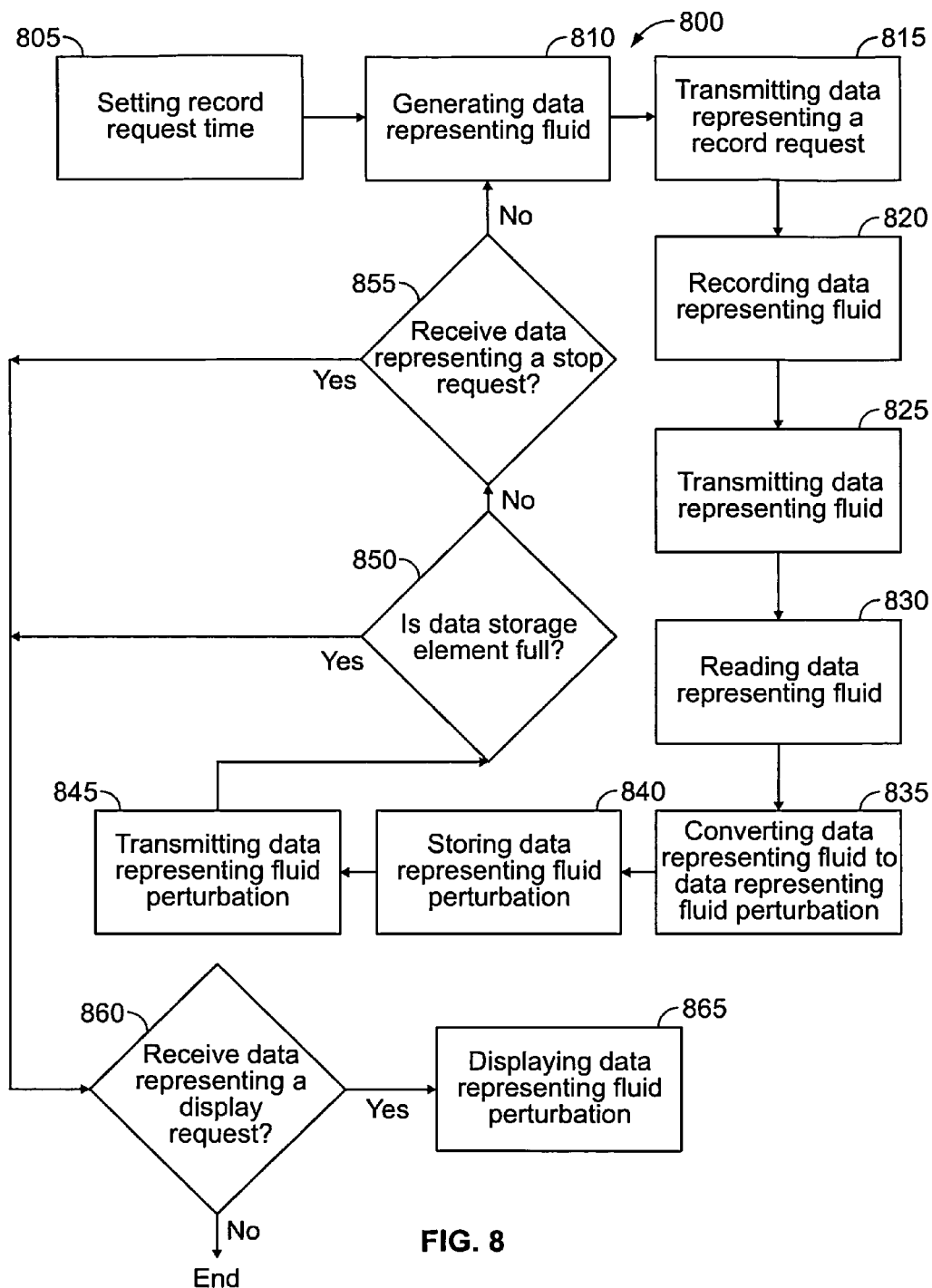
FIG. 8 illustrates a flow chart of a method for displaying data representing fluid perturbation.

FIG. 8 illustrates a flow chart of a method for displaying data representing fluid perturbation 800. First, at step 805, a user sets a record request time. The user preferably sets a record request time by inputting data representing a record request time on the user input device 135 of FIG. 1. The record request time is preferably one millisecond.

Next, at step 810, the sensor module 410 of FIG. 4A generates or detects data representing fluid. The sensor module 410 of FIG. 4A preferably has the sensing pin array 450 that includes 300 sensing pins.

Next, at step 815, the data management system microprocessor 510 of the data management system 120 of FIG. 5 transmits data representing a record request to the connector 490 of the sensor module 410 of FIG. 4A. The data representing a record request is preferably an update pulse. After the connector 490 of the sensor module 410 of FIG. 4A receives the data representing a record request, the connector 490 of the sensor module 410 of FIG. 4A transmits the data representing a record request to the first sensor module microprocessor 440 of the sensor module 410 of FIG. 4A and the second sensor module microprocessor 445 of the sensor module 410 of FIG. 4A.

Next, at step 820, the first sensor module microprocessor 440 of the sensor module 410 of FIG. 4A and the second sensor module microprocessor 445 of the sensor module 410 of FIG. 4A record the data representing fluid. The first sensor module microprocessor 440 of the sensor module 410 of FIG. 4A and the second sensor module microprocessor 445 of the sensor module 410 of FIG. 4A preferably records the data representing fluid by reading logic high as "1" and logic low as "0." Step 820 is preferably completed on the order of nanoseconds.

Next, at step 825, the first sensor module microprocessor 440 of the sensor module 410 of FIG. 4A and the second sensor module microprocessor 445 of the sensor module 410 of FIG. 4A transmit the data representing fluid to the connector 490 of the sensor module 410 of FIG. 4A. Then the connector 490 of the sensor module 410 of FIG. 4A transmits the data representing fluid to the data management system aggregator 520 of the data management system 120 of FIG. 5. The connector 490 of the sensor module 410 of FIG. 4A preferably serially transmits the data representing fluid to the data management system aggregator 520 of the data management system 120 of FIG. 5.

Next, at step 830, the data management system aggregator 520 of the data management system 120 of FIG. 5 reads the data representing fluid. The data management system aggregator 520 of the data management system 120 of FIG. 5 is preferably dual-port RAM.

Next, at step 835, the data management system aggregator 520 of the data management system 120 of FIG. 5 converts the data representing fluid to data representing fluid perturbation by recording the data representing fluid received from the sensor module 410 of FIG. 4A. Then the data management system aggregator 520 of the data management system 120 of FIG. 5 transmits the data representing fluid perturbation to the data management system storage 530 of the data management system 120 of FIG. 5.

When the record request time is preferably one millisecond, the time elapsed after step 825, step 830, and step 835 is preferably 300 microseconds.

Next at step 840, the data management system aggregator 520 of the data management system 120 of FIG. 5 stores the data representing fluid perturbation.

Next, at step 845, the data management system storage 530 of the data management system 120 of FIG. 5 transmits the data representing fluid perturbation to the control system 130 of FIG. 1. The control system 130 of FIG. 1, preferably stores the data representing fluid perturbation on a control system data storage element 132. The data representing fluid perturbation may be used for detailed analysis by scientists, researchers, and engineers. After step 845 is achieved, one data capture cycle is preferably complete.

When the record request time is preferably one millisecond, the time elapsed after step 840 and step 845 is 700 microseconds.

Next, at step 850, the control system 130 of FIG. 1 determines whether the control system storage element 132 of the control system 130 of FIG. 1 is full. When the control system 130 of FIG. 1 determines that the control system data storage element 132 of the control system 130 of FIG. 1 is full, the method of displaying fluid perturbation proceeds to step 860. When the control system 130 of FIG. 1 determines that the control system data storage element 132 is not full, the method of displaying data representing fluid perturbation 800 proceeds to step 855.

Next, at step 855, the data management system microprocessor 510 of the data management system 120 of FIG. 5 determines whether the data management system microprocessor 510 of the data management system 120 of FIG. 5 has received data representing a stop request. The user preferably inputs data representing a stop request on the user input device 135 of FIG. 1. When the user inputs the data representing a stop request, the user input device 135 of FIG. 1 transmits the data representing a stop request to the control 130 of FIG. 1. Then the control system 130 of FIG. 1 transmits the data representing a stop request to the data management system microprocessor 510 of the data management system 120 of FIG. 5.

When the data management system microprocessor 510 of the data management system 120 of FIG. 5 determines that the data management system microprocessor 510 of the data management system 120 of FIG. 5 has received the data representing a stop request, the method for displaying data representing fluid perturbation 800 proceeds to step 860. When the data management system microprocessor 510 of the data management system 120 of FIG. 5 determines that the data management system microprocessor 510 of the data management system 120 of FIG. 5 has not received the data representing a stop request, the method for displaying data representing fluid perturbation 800 proceeds to step 810.

Next, at step 860, the control system 130 of FIG. 1 determines whether the control system 130 has received data representing a display request. The user preferably inputs data representing a display request on the user input device 135 of FIG. 1. When the user inputs the data representing a display request, the user input device 135 of FIG. 1 transmits the data representing a display request to the control 130 of FIG. 1. When the control system 130 of FIG. 1 determines that the control system 130 of FIG. 1 has received the data representing a display request, the method for displaying data representing fluid perturbation 800 proceeds to step 865. When the control system 130 of FIG. 1 determines that the control system 130 of FIG. 1 has not received data representing a display request, the method for displaying data representing fluid perturbation 800 ends.

Next, at step 865, the control system 130 of FIG. 1 displays the data representing fluid perturbation. The data representing fluid perturbation is preferably displayed with a computer software program as shown in FIG. 9, FIG. 10, and FIG. 15.

FIG. 9 illustrates a plan view of a first fluid perturbation display 900. The first fluid perturbation display 900 includes a horizontal display axis 910, a vertical display axis 920, and first fluid perturbation data 930.

In the first fluid perturbation display 900, the horizontal display axis 910 is affixed to the vertical display axis 920. Moreover, the horizontal display axis 910 is perpendicular to vertical display axis 920. The first fluid perturbation data 930 is disposed between the horizontal display axis 910 and the vertical display axis 920.

In operation, the first fluid perturbation display 900 preferably illustrates a linear wave profile time series. Accordingly, the first fluid perturbation data 930 represents a linear wave. The vertical display axis 920 preferably represents fluid location as indicated by sensing pin number and the horizontal display axis 910 preferably represents time in seconds.

In an alternative embodiment, the vertical display axis 920 represents fluid location by physical displacement.

The first fluid perturbation data 930 may be used for detailed analysis by scientists, researchers, and engineers.

FIG. 10 illustrates a plan view of a second fluid perturbation display 1000. The second fluid perturbation display 1000 includes the horizontal display axis 910 of FIG. 9, the vertical display axis 920 of FIG. 9, and second fluid perturbation data 1030.

In the second fluid perturbation display 1000, the horizontal display axis 910 of FIG. 9 is affixed to the vertical display axis 920 of FIG. 9. Moreover, the horizontal display axis 910 of FIG. 9 is perpendicular to vertical display axis 920 of FIG. 9. The second fluid perturbation data 1030 is disposed between the horizontal display axis 910 of FIG. 9 and the vertical display axis 920 of FIG. 9.

In operation, the second fluid perturbation display 1000 preferably illustrates a nonlinear wave profile. Accordingly, the second fluid perturbation data 1030 represents a nonlinear wave such as a breaking wave. Like the first fluid perturbation display 900 of FIG. 9, the vertical display axis 920 of FIG. 9 preferably represents fluid location as indicated by sensing pin number and the horizontal display axis 910 of FIG. 9 preferably represents time in seconds.

In an alternative embodiment, the vertical display axis 920 of Figure represents fluid location by physical displacement.

The second fluid perturbation data 1030 may be used for detailed analysis by scientists, researchers, and engineers.

Figure 11:
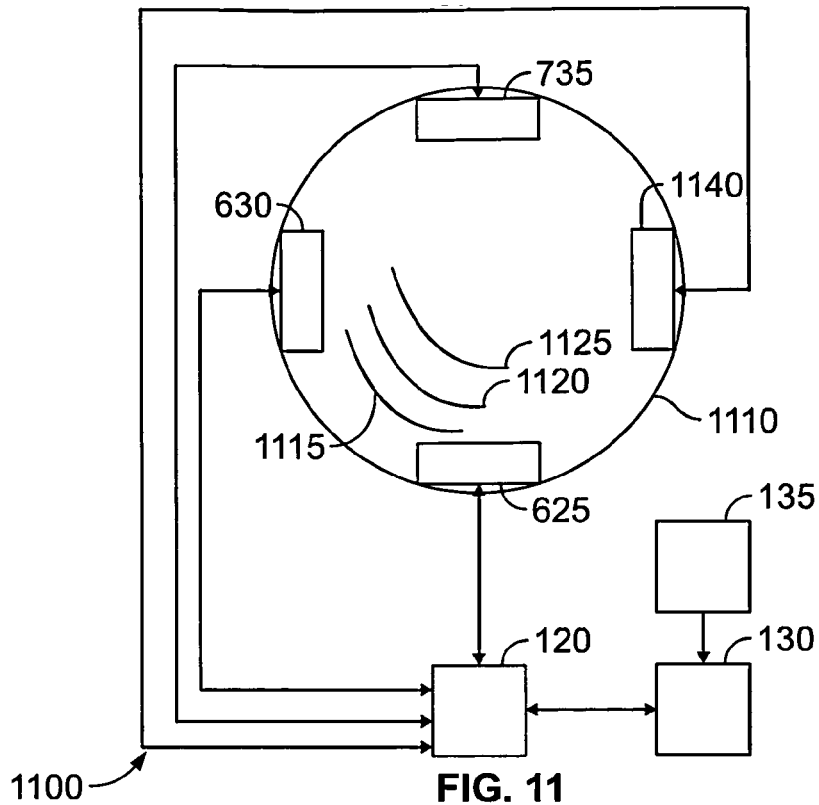
FIG. 11 illustrates a top view of a system for measuring fluid perturbation.

FIG. 11 illustrates a top view of a system for measuring fluid perturbation 1100. Like the system for measuring fluid perturbation 600 of FIG. 6, the system for measuring fluid perturbation 1100 includes the first sensor probe 625 of FIG. 6, the second sensor probe 630 of FIG. 6, the third sensor probe 735 of FIG. 7, the data management system 120 of FIG. 1, the control system 130 of FIG. 1, and the user input device 135 of FIG. 1. Additionally, the system for measuring fluid perturbation 1100 includes a cylindrical tank 1110, a first tank wave 1115, a second tank wave 1120, a third tank wave 1125, and a fourth sensor probe 1140, which is preferably the sensor module 410 of FIG. 4A with the sensing pin array 450 that includes 300 sensing pins.

In the system for measuring fluid perturbation 1100, the connections described above for the system for measuring fluid perturbation 600 of FIG. 6 exist. Additionally, the fourth sensor probe 1140 is electrically connected to the data management system 120 of FIG. 1. In the system for measuring fluid perturbation 1100, the first sensor probe 625 of FIG. 6, the second probe of FIG. 6, the third sensor probe 735 of FIG. 7, and the fourth sensor probe 1140 are preferably located circumferentially against the wall of cylindrical tank 1110 parallel to the fluid flow to lessen any flow resistance created by the first sensor probe 625 of FIG. 6, the second probe of FIG. 6, and the third sensor probe 735 of FIG. 7, and the fourth sensor probe 1140.

In operation, the system for measuring fluid perturbation 1100 functions similarly to the system for measuring fluid perturbation 600 as described above. Accordingly, the system for measuring fluid perturbation 1100 measures the fluid perturbation caused by the first tank wave 1115, the second tank wave 1120, and the third tank wave 1125.

The system for measuring fluid perturbation 1100 may be used to monitor mixing and agitation, filling, and draining in the cylindrical tank 1110. The cylindrical tank 1100 may be located in variety of environments including a research laboratory or industrial setting.

The tank 1110 is preferably cylindrical. The tank 1110 may be any other shape including spherical or cubical. The tank 1110 may have circular, elliptical, or polygonal cross-section, including a square or rectangular cross-section.

In an alternative embodiment, the data management system 120 of FIG. 1 may transmit the data representing fluid perturbation to an alarm device (not shown). The alarm device, for example, may be an agitation alarm. Accordingly, when the data representing fluid perturbation exceeds a predetermined threshold value, the alarm device generates an alarm.

In an alternative embodiment, the system for measuring fluid perturbation 1100 does not include the first tank wave 1115, the second tank wave 1120, and the third tank wave 1125. In this embodiment, the system for measuring fluid perturbation measures the fluid perturbation caused by a vertical displacement of the entire fluid surface.

Figure 12:
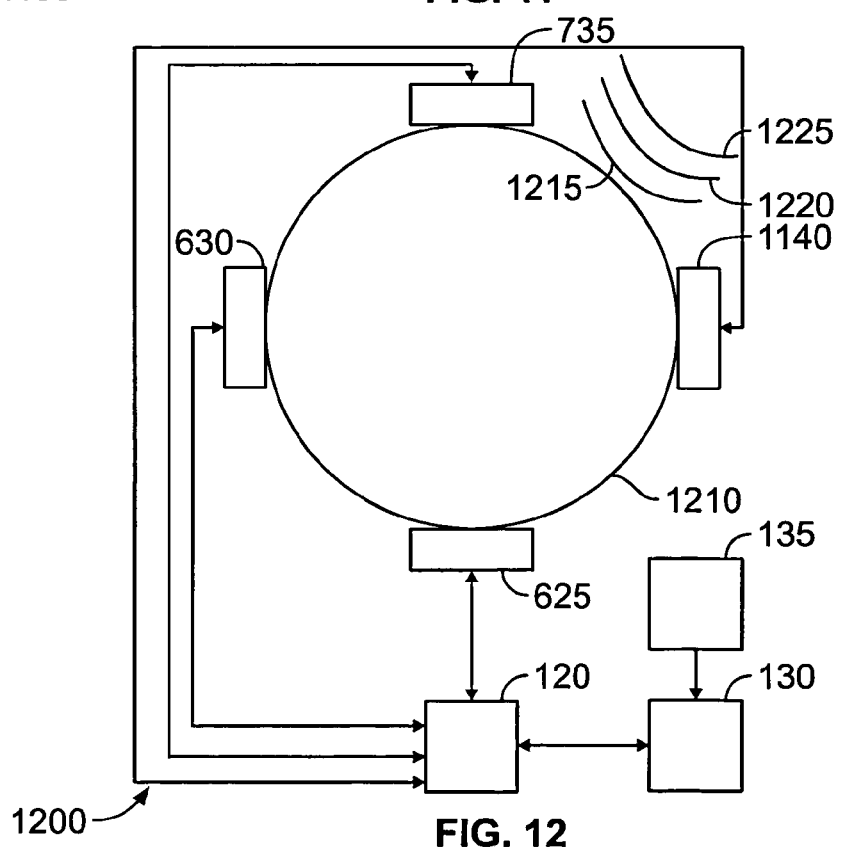
FIG. 12 illustrates a plan view of an alternative embodiment system for measuring fluid perturbation.

FIG. 12 illustrates a plan view of an alternative embodiment system for measuring fluid perturbation 1200. Like the system for measuring fluid perturbation 1100 of FIG. 11, the system for measuring fluid perturbation 1200 includes the first sensor probe 625 of FIG. 6, the second sensor probe 630 of FIG. 6, the third sensor probe 735 of FIG. 7, the fourth sensor probe 1140 of FIG. 11, the data management system 120 of FIG. 1, the control system 130 of FIG. 1, and the user input device 135 of FIG. 1. Additionally, the system for measuring fluid perturbation 1100 includes a pylon 1210, a first wave crest 1215, a second wave crest 1220, and a third wave crest 1225.

In the system for measuring fluid perturbation 1200, the connections described above for the system for measuring fluid perturbation 1100 of FIG. 11 exist. In the system for measuring fluid perturbation 1100, the first sensor probe 625 of FIG. 6, the second probe of FIG. 6, the third sensor probe 735 of FIG. 7, and the fourth sensor probe 1140 are preferably located circumferentially around the wall of the pylon 1210 parallel to the fluid flow to lessen any flow resistance created by the first sensor probe 625 of FIG. 6, the second probe of FIG. 6, and the third sensor probe 735 of FIG. 7, and the fourth sensor probe 1140 of FIG. 11. The pylon 1210 is preferably located in a sediment bed in an open water source such as a river, a lake, or an ocean.

In operation, the system for measuring fluid perturbation 1200 functions similarly to the system for measuring fluid perturbation 1100 as described above. Accordingly, the system for measuring fluid perturbation 1200 measures the fluid perturbation caused by the first wave crest 1215, the second wave crest 1220, and the third wave crest 1225.

The system for measuring fluid perturbation 1200 may be used to measure local-wise wave celerity, reach-wise wave celerity, wave direction, wave spectra, and wave forces acting on the pylon 1210 and surrounding sediment. The system for measuring fluid perturbation 1200 may also be used to measure attenuation of waves through vegetation or sediment formations.

The pylon 1210 may be any structure located in an open water source such as a buoy or a pier, support for an offshore oil rig, or the hull of a ship.

In an alternative embodiment, the data management system 120 of FIG. 1 may transmit the data representing fluid perturbation to an alarm device (not shown). The alarm device, for example, may be a wave force alarm. Accordingly, when the data representing fluid perturbation exceeds a predetermined threshold value or nonlinearity condition, the alarm device generates an alarm.

Figure 13:
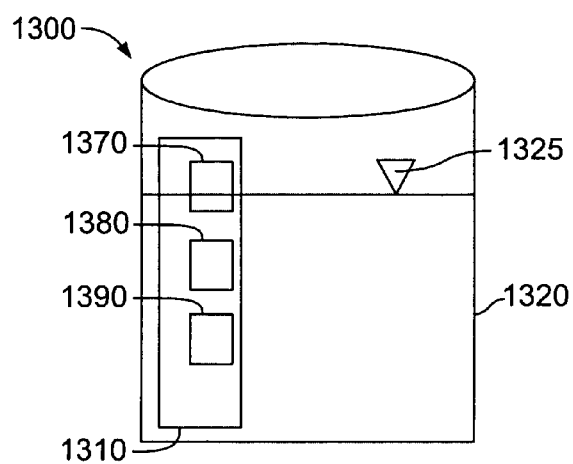
FIG. 13 illustrates a cut-away view of a system for measuring fluid perturbation.

FIG. 13 illustrates a cut-away view of a system for measuring fluid perturbation 1300. The system for measuring fluid perturbation 1300 includes a sensor device 1310, a well 1320, and a well liquid level 1325. The sensor device 1310 includes a sensor device power supply 1370, a sensor device storage element 1380, and a sensor device input 1390.

In the system for measuring fluid perturbation 1300, the sensor device 1310 is suspended in the well 1320. The sensor device 1310 is preferably submerged in the well 1320 partially below the well liquid level 1325. The sensor device power supply 1370 is electrically coupled to the sensor device storage element 1380. The sensor device power supply 1370 is electrically coupled to the sensor device input 1390. The sensor device storage element 1380 is electrically coupled to the sensor device input 1390.

In operation, the well liquid level 1320 preferably varies over time due to fluid flow. The sensor device 1320 is preferably located in the well 1320 parallel to the fluid flow. The sensor device 1310 is preferably the sensor module 410 of FIG. 4A with a sensing pin array 450 of the sensor module 410 of FIG. 4A that includes 300 sensing pins.

The system for measuring fluid perturbation 1300 performs functions similarly to the system for measuring fluid perturbation 600 as described above except the addition of the sensor device power supply 1370 and the sensor device storage element 1380 enable the sensor device 1310 to perform functions similar to the data management system 120 of FIG. 1 as described below.

The sensor power supply 1370 provides electrical power to the sensor device 1310 to enable the sensor device 1310 to perform the foregoing functions. The sensor power supply 1370 preferably provides electrical power to the sensor device 1310 for six months.

The sensor device 1310 reads and records data representing fluid in a series of steps. Before the sensor device 1310 is installed in the well 1320, a user inputs data representing a record request time on the sensor device input 1390. The record request time is preferably ten minutes. The sensor device input 1390 is preferably a water-proof, electronic touch screen.

After the user inputs the data representing a record request time using the sensor device input 1390, the sensor device input 1390 transmits the data representing a record request time to the sensor device 1310. When the sensor device 1310 is installed in the well 1320, the sensor device 1310 generates data representing fluid as described above in FIG. 4A. When the record request time elapses, the sensor device 1310 records the data representing fluid as described above in FIG. 4A, and converts the data representing fluid into data representing fluid perturbation similarly to the data management system 120 of FIG. 1 as described above in FIG. 5.

Next, the sensor device 1310 transmits the data representing fluid perturbation to sensor device storage element 1380. In another embodiment of the invention, the sensor device storage element 1380 is preferably a USB buffer memory. The sensor device storage element 1380 stores the data representing fluid perturbation in response to receiving the data representing fluid perturbation from the sensor device 1310.

Generating the data representing fluid, recording the data representing fluid, converting the data representing fluid to the data representing fluid perturbation, and storing the data representing fluid perturbation is one data capture cycle. The system for measuring fluid perturbation 1300 preferably performs more than one data capture cycle. For example, when the sensor power supply 1370 provides electrical power to the sensor device 1310 for six months and the record request time is ten minutes, the system for measuring fluid perturbation 1300 preferably performs 24,192 data capture cycles.

The system for measuring fluid perturbation 1300 may be used to monitor perception and groundwater levels. The system for measuring fluid perturbation 1300 may also be used to monitor pumping from a reservoir.

In an alternative embodiment, the sensor device input 1390 may be any user input device that is temporarily electrically connected to the sensor device 1310 before the sensor device is 1310 is installed in the well 1320, including a personal computer. After a user inputs data representing a record request time on the sensor device input 1390, the sensor device input 1390 transmits the data representing a record request time to the sensor device 1310. After sensor device 1310 receives the data representing a record request time, the user removes the temporary electrical connection between the sensor device 1310 and the sensor device input 1390. Then the user installs the sensor device 1310 in the well 1320.

Figure 14:
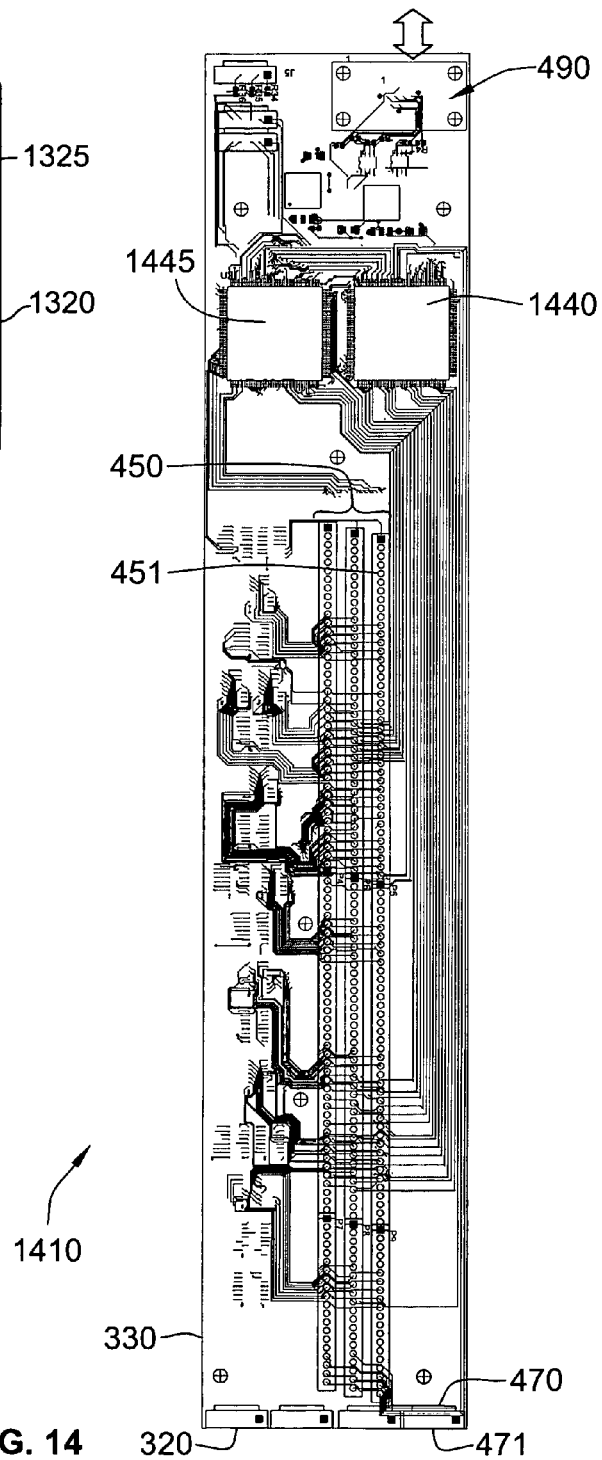
FIG. 14 illustrates an elevational view of an alternative embodiment sensor module.

FIG. 14 illustrates an elevational view of an alternative embodiment sensor module 1410. Like the sensor module 410, the sensor module 1410 includes the horizontal axis 320 of FIG. 3, the vertical axis 330 of FIG. 3, the sensing pin array 450 of FIG. 4A, a grounding pin row 470 of FIG. 4A, and the connector 490 of FIG. 4A. The sensing pin array 450 of FIG. 4A includes the sensing pin 451 of FIG. 4A. The grounding pin row 470 of FIG. 4A includes the grounding pin 471 of FIG. 4A.

Unlike the sensor module 410 of FIG. 4A, the sensor module 1410 includes a third sensor module microprocessor 1440 and a fourth sensor module microprocessor 1445.

In the sensor module 1410, like the sensor module 410 of FIG. 4A, the horizontal axis 320 of FIG. 3 is affixed to the vertical axis 330 of FIG. 3. When a conductive fluid contacts both the sensing pin array 450 of FIG. 4A and the grounding pin row 470 of FIG. 4A, the sensing pin array 450 of FIG. 4A is electrically connected to the grounding pin row 470 of FIG. 4A. The grounding pin row 470 of FIG. 4A is electrically connected to earth ground. The grounding pin row 470 of FIG. 4A is affixed to the horizontal axis 320. The connector 490 of FIG. 4A is in bidirectional communication with the data management system 120 of FIG. 1.

In the sensor module 1410, unlike the sensor module 410 of FIG. 4A, the third sensor module microprocessor 1440 is electrically connected to the sensing pin array 450 of FIG. 4A. The fourth sensor module microprocessor 1445 is electrically connected to the sensing pin array 450 of FIG. 4A. The third sensor module microprocessor 1440 is electrically connected to the connector 490 of FIG. 4A. The fourth sensor module microprocessor 1445 is electrically connected to the connector 490 of FIG. 4A.

In the sensor module 1410, the third sensor module microprocessor 1440 is electrically connected to the sensing pin 451 of the sensing pin array 450 of FIG. 4A. The sensing pin 451 of the sensing pin array 450 of FIG. 4A is electrically connected to the grounding pin 471 of the grounding pin row 470 of FIG. 4A.

In operation, the sensor module 1410 functions similarly to the sensor module 410 of FIG. 4A as described above except that the third sensor module microprocessor 1440 and the fourth sensor module microprocessor 1445 perform more functions than the first sensor module microprocessor 440 of FIG. 4A and the second sensor module microprocessor 445 of the sensor module 410 of FIG. 4A as described below.

The sensor module 1410, which is preferably partially submerged in a conductive fluid, generates data representing fluid. The sensing pin 451 of the sensing pin array 450 of FIG. 4A forms an electrical circuit with the third sensor module microprocessor 1440 and the grounding pin 471 of the grounding pin row 470 of FIG. 4A. When the conductive fluid does not contact both the grounding pin 471 of the grounding pin row 470 of FIG. 4A and the sensing pin 451 of the sensing pin array 450 of FIG. 4A, the sensing pin 451 of the sensing pin array 450 of FIG. 4A generates a first data value representing fluid, which is preferably logic high. When the conductive fluid contacts both the grounding pin 471 of the ground pin row 470 of FIG. 4A and the sensing pin 451 of the sensing pin array 450 of FIG. 4A, the sensing pin 451 of the sensing pin array 450 of FIG. 4A generates a second data value representing fluid, which is preferably logic low.

The sensing pin array 450 of FIG. 4A preferably includes 300 sensing pins with similar connections and similar functionality to the sensing pin 451 of the sensing pin array 450 of FIG. 4A. For example, 150 sensing pins of the sensing pin array 450 of FIG. 4A are preferably connected to the third sensor module microprocessor 1440, and 150 sensing pins of the sensing pin array 450 of FIG. 4A are preferably connected to the fourth sensor module microprocessor 1445. The 300 sensing pins are preferably located in a three by one hundred grid. Horizontally adjacent pins are preferably spaced about 850 micrometers apart. Vertically adjacent pins are preferably spaced about 850 micrometers apart.

The sensor module 1410 reads and records the data representing fluid in a series of steps. First, when the connector 490 of FIG. 4A, which is preferably a water-proof connector, receives data representing a record request from the data management system 120 of FIG. 1, the connector 490 of FIG. 4A transmits the data representing a record request to the third sensor module microprocessor 440, which is preferably a CPLD manufactured by Xilinx. Like the third sensor module microprocessor 1440, the fourth sensor module microprocessor 1445 is preferably a CPLD manufactured by Xilinx.

Next, the third sensor module microprocessor 1440 preferably turns the sensing pin 451 of the sensing pin array 450 of FIG. 4A to output mode in response to receiving the data representing a record request from the connector 490 of FIG. 4A. Then the third sensor module microprocessor 1440 first preferably turns the sensing pin 451 of the sensing pin array 450 of FIG. 4A to logic high and then preferably turns the sensing pin 451 of the sensing pin array 450 of FIG. 4A to input mode. When the third sensor module microprocessor first preferably turns the sensing pin 451 of the sensing pin array of FIG. 4A to logic high and then preferably turns the sensing pin 451 of the sensing pin array 450 of FIG. 4A to input mode, a weak-keeper circuit of the sensing pin 451 of the sensing pin array 450 of FIG. 4A, which is preferably internal to the third sensor module microprocessor 1440, is engaged.

After a predetermined time has elapsed since the weak-keeper circuit is engaged, which is preferably ten nanoseconds, the third module microprocessor 1440 records the data representing fluid generated by the sensing pin 451 of the sensing pin array 450 of FIG. 4A. The third sensor module microprocessor 1440 preferably records the data representing fluid by reading a data value representing fluid generated by the sensing pin 451 of the sensing pin array 450 of FIG. 1. The third sensor module microprocessor 1440 preferably reads logic high as "1" and logic low as "0." Then the third sensor module microprocessor 1440 transmits the data representing fluid to the connector 490 of FIG. 4A. The data representing fluid is preferably a data string representing the data value representing fluid generated by the sensing pin 451 of the sensing pin array 450 of FIG. 4A.

As described above, the sensing pin array 450 of FIG. 4A preferably includes 300 sensing pins with similar connections and similar functionality to the sensing pin 451 of the sensing pin array 450 of FIG. 4A. Accordingly, the data string preferably represents the data values representing fluid generated by all of the 300 sensing pins of sensing pin array 450 of FIG. 4A.

The sensor module 1410 transmits the data representing fluid in a series of steps. First, the third sensor module microprocessor 1440 transmits the data representing fluid to the connector 490 of FIG. 4A. Then the connector 490 of FIG. 4A transmits the data representing fluid to the data management system 120 of FIG. 1.

As described above, the sensor module 1410 is preferably partially submerged in the conductive fluid. The sensor module 1410 is preferably coated with epoxy to prevent the fluid from damaging the sensor module 1410. The epoxy is preferably applied to the sensor module 1410 such that the tip of the sensing pin 451 of the sensing pin array 450 of FIG. 4A and the connector 490 of FIG. 4A preferably remain exposed to the fluid.

The predetermined time between the weak-keep circuit engaging and the third sensor module microprocessor 1440 recording the data representing fluid generated by the sensing pin 451 of the sensing pin array 450 of FIG. 4A may be adjusted to measure the resistivity of the fluid. For example, civil engineers frequently measure density currents, which include mixtures of salt water and fresh water. Because the salt water and the fresh water have different resistivity, the predetermined time between the weak-keep circuit engaging and the third sensor module microprocessor 1440 recording the data representing fluid generated by the sensing pin 451 of the sensing pin array 450 of FIG. 4A may be adjusted such that the salt water in the density current is measured but the fresh water in the density current is not measured.

The spatial resolution of the sensor module 1410 is preferably 850 micrometers. Alternatively, the spatial resolution may be 100 to 1,000 micrometers. In another embodiment, the spatial resolution may be anywhere on the micrometer scale or millimeter scale.

In an alternative embodiment, the sensing pin array 450 of FIG. 4A includes 100 sensing pins that are preferably located along an axis perpendicular to the vertical axis 320 of FIG. 3.

In another embodiment, an electrical wire (not shown), which preferably extends along the vertical axis 330 of FIG. 3, is electrically connected to the grounding pin row 470 of FIG. 4A. When the conductive fluid contacts both the electrical wire and the sensing pin 451 of the sensing pin array 450 of FIG. 4A, the sensing pin 451 of the sensing pin array 450 of FIG. 4A generates a data value representing fluid, which is preferably logic low.

The electrical connection between the electrical wire and the grounding pin row 470 of FIG. 4A enables the sensor module 1410 to recognize fluid overtopping (as shown below in FIG. 15). Fluid overtopping may occur when waves hit the top of structure located in an open water source such as a break water, jetty structure, or seawall.

The sensor module 1410 may be the first sensor probe 625 of FIG. 6, the second sensor probe 630 of FIG. 6, the third sensor probe 735 of FIG. 7, the fourth sensor probe 1140 of FIG. 11, and the sensor device 1310 of FIG. 13. Accordingly, the sensor module 1410 may be a part of the system for measuring fluid perturbation 600 of FIG. 6, the system for measuring fluid perturbation 700 of FIG. 7, the method for displaying data representing fluid perturbation 800 of FIG. 8, the system for measuring fluid perturbation 1100 of FIG. 11, the system for measuring fluid perturbation 1200 of FIG. 12, and the system for measuring fluid perturbation 1300 of FIG. 13.

FIG. 15 illustrates a plan view of a third fluid perturbation display 1500. The third fluid perturbation display 1500 includes the horizontal display axis 910 of FIG. 9, the vertical display axis 920 of FIG. 9, and third fluid perturbation data 1530.

In the third fluid perturbation display 1500, the horizontal display axis 910 of FIG. 9 is affixed to the vertical display axis 920 of FIG. 9. Moreover, the horizontal display axis 910 of FIG. 9 is perpendicular to vertical display axis 920 of FIG. 9. The third fluid perturbation data 1530 is disposed between the horizontal display axis 910 of FIG. 9 and the vertical display axis 920 of FIG. 9.

In operation, the third fluid perturbation display 1000 preferably illustrates a fluid overtopping condition. Accordingly, the second fluid perturbation data 1030 represents a cross-section of incident fluid. Like the first fluid perturbation display 900 of FIG. 9, the vertical display axis 920 of FIG. 9 preferably represents fluid location as indicated by sensing pin number and the horizontal display axis 910 of FIG. 9 preferably represents time in seconds.

In an alternative embodiment, the vertical display axis 920 of FIG. 9 represents fluid location by physical displacement.

The third fluid perturbation data 1530 may be used for detailed analysis by scientists, researchers, and engineers.

Figure 16:
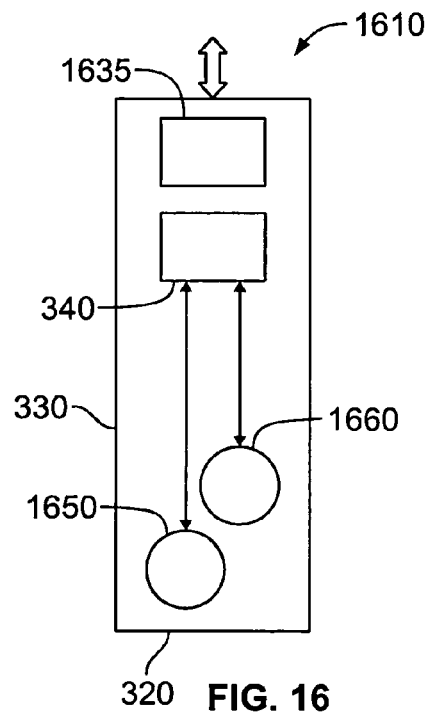
FIG. 16 illustrates an elevational view of an alternative embodiment sensor module.

FIG. 16 illustrates an alternative embodiment sensor module 1610. The sensor module 1610 includes the horizontal axis 320 of FIG. 3, the vertical axis 330 of FIG. 3, the sensor module microprocessor 340 of FIG. 3, a transmitter 1635, a first receiver 1650, and a second receiver sensor 1660.

The sensor module 1610 has the connections of the sensor module 110 of FIG. 1. Moreover, the transmitter 1635 is disposed on the sensor module 1610. The first receiver 1650 is laterally offset from the horizontal axis 320 of FIG. 3. The second receiver 1660 is laterally offset from the vertical axis 330 of FIG. 3. The first receiver 1650 is vertically offset from the second receiver 1660, and the first receiver 1650 is horizontally offset from the second receiver 1660. The first receiver 1650 is electrically connected to the sensor module microprocessor 340 of FIG. 3. The second receiver 1660 is electrically connected to the sensor module microprocessor 340 of FIG. 3. The first receiver 1650 and second receiver 1660 are preferably offset from each other by no more than 850 micrometers.

In operation, the sensor module 1610 functions similarly to the sensor module 110 of FIG. 1 as described above except that the transmitter 1635, the first receiver 1650, and the second receiver 1660 generate data representing fluid differently as described below.

The sensor module 1635, which is preferably partially buried in sediment and partially submerged in a conductive fluid, generates and records data representing fluid in a series of steps. First, the transmitter 1635 transmits a measure signal perpendicularly along the vertical axis 330 of FIG. 3 toward the horizontal axis 320 of FIG. 3. The measure signal is preferably an infrared (IR) signal. The first receiver 1650, which is preferably an IR receiver, generates a first data value representing fluid, and the second receiver 1660, which is preferably an IR receiver, generates a second data value representing fluid. The first data value representing fluid generated by the first receiver 1650 preferably may optionally be logic low or logic high. When the first receiver 1650 receives the measure signal, the first data value representing fluid generated by the first sensor 350 is preferably logic low. When the first receiver 1650 does not receive the measure signal, the first data value representing fluid generated by the first receiver 1650 is preferably logic high. When the first receiver 1650 is buried in sediment, the first receiver 1650 preferably does not receive the measure signal.

The second data value representing fluid generated by the second receiver 1660 preferably may optionally be logic low or logic high. When the second receiver 1660 receives the measure signal, the second data value representing fluid generated by the second receiver 1660 is preferably logic low. When the second receiver 1660 does not receive the measure signal, the second data value representing fluid generated by the second receiver 1660 is preferably logic high. When the second receiver 1660 is buried in sediment, the second receiver 1660 preferably does not receive the measure signal.

Then when the sensor module microprocessor 340 of FIG. 3, which is preferably a CPLD, receives data representing a record request from the data management system 120 of FIG. 1, the sensor module microprocessor 340 of FIG. 3 reads the first data value representing fluid generated by the first receiver 1650 and reads the second data value representing fluid generated by the second receiver 1660. The sensor module microprocessor 340 of FIG. 3 preferably reads the first data value representing fluid by the first receiver 1650 and reads the second data value representing fluid generated by the second receiver 1660 simultaneously. When the first receiver receives the measure signal, the first data value representing fluid, which is preferably logic low, is preferably read as a "0" by the sensor module microprocessor 340 of FIG. 3. When the second receiver 1660 does not receive the measure signal, the second data value representing fluid, which is preferably logic high, is preferably read as a "1" by the sensor module microprocessor 340 of FIG. 3.

In another embodiment, when the first receiver 1650 receives the measure signal, the first data value representing fluid generated by the first receiver 1650 is preferably logic high. In this embodiment, when the first receiver 1650 does not recognize the fluid, the first data value representing fluid generated by the first receiver 1650 is preferably logic low. Moreover, when the second receiver 1660 receives the measure signal, the second data value representing fluid generated by the second receiver 1660 is preferably logic high. In this embodiment, when the second receiver 1660 does not recognize the fluid, the second data value representing fluid generated by the second receiver 1660 is preferably logic low.

The first data value representing fluid generated by the first receiver 1650 and the second data value representing fluid generated by the second receiver 1660 may be equal depending on fluid-sediment interface conditions. Accordingly, the data string representing the first data value representing fluid generated by the first receiver 1650 and the second data value representing fluid generated by the second sensor 1660 that were recorded by the sensor module microprocessor 340 may optionally be "00" or "11."

Further still, the first data value representing fluid generated by the first receiver 1650 and the second data value representing fluid generated by the second receiver 1660 may vary over time depending on fluid-sediment interface conditions.

The spatial resolution of the sensor module 1610 is preferably 850 micrometers. The sensor module 1610 may be used to monitor erosion at a sediment-fluid interface. Alternatively, the spatial resolution may be 100 to 1,000 micrometers. In another embodiment, the spatial resolution may be anywhere on the micrometer scale or millimeter scale.

In an alternative embodiment, the first receiver 1650 is not horizontally offset from the second receiver 1660. The first receiver 1650 and the second receiver 1660 are located on an axis perpendicular to the vertical axis 330 of FIG. 3. In this embodiment, the first receiver 1650 is vertically offset from the second receiver 1660.

In an another embodiment, the transmitter 1635 the transmitter 1635 transmits a measure signal, which comprises visible light, perpendicularly along the vertical axis 330 of FIG. 3 toward the horizontal axis 320 of FIG. 3. In this embodiment, the first receiver 1650 is preferably a photoresistor and the second receiver 1660 is preferably a photoresistor.

In view of the foregoing teaching, one or more embodiments of the present invention provide numerous advantages over other known systems, methods, and devices for measuring fluid perturbation. Importantly, the system for measuring fluid perturbation 100 of FIG. 1 has a high sampling rate, high spatial resolution, low cost, is flexible in application, and provides data for detailed analysis.

First, the system for measuring fluid perturbation 100 has a high sampling rate. In operation, the sensor module 110 of FIG. 1 preferably receives data representing a record request time from the data management system 120 of FIG. 1 in one millisecond. Receiving the data representing a record request time in one millisecond corresponds to a sampling rate of 1 Khz. As described above, acoustic systems typically have a sampling rate of 10 Hz to 20 Hz. Accordingly, the preferable sampling rate of the system for measuring fluid perturbation 100 of FIG. 1 is greater than the sampling rate of acoustic systems by approximately a factor of 100.

Moreover, unlike capacitance systems that rely on electrically insulated capacitance probes, the sensor module 110 of FIG. 3 and the senor module 410 of FIG. 4A use a fluid as an electrical conductor. Using the electrical conductivity of the fluid enables a high sampling rate for the system for measuring fluid perturbation 100 of FIG. 1.

Second, the system for measuring fluid perturbation has high spatial resolution. For example, unlike the system of Wang, which typically uses 16 conductive probes, and the system of Richards which typically uses 16 electrodes, the sensing pin array 450 of the sensor module 410 of FIG. 4A preferably includes 300 sensing pins. The 300 sensing pins are preferably located in a three by one hundred grid. Horizontally adjacent pins are preferably spaced about 850 micrometers apart. Vertically adjacent pins are preferably spaced about 850 micrometers apart. Accordingly, unlike the system of Richards, which only has a spatial resolution of 5 millimeters, the spatial resolution of the system for measuring fluid perturbation 100 of FIG. 1 is preferably 850 micrometers. Further still, unlike the system of Richards, which uses analog-to-digital conversion to interpolate between electrodes, the system for measuring fluid perturbation 100 of FIG. 1 is digital and does not interpolate between sensing pins.

With a high sampling rate and high spatial resolution, the system for measuring fluid perturbation 100 makes robust liquid-level measurements. Moreover, a high sampling rate and a high spatial resolution through independent sensor modules enables the system for measuring fluid perturbation 100 to resolve complex nonlinear fluid phenomena, such as breaking waves. Neither the system of Wang nor the system of Richards is accurate enough to resolve breaking waves.

Third, the system for measuring fluid perturbation 100 of FIG. 1 has a low cost. For example, the sensor module 410 of FIG. 4A is roughly half the cost of prior art acoustic and capacitance sensor devices.

Fourth, embodiments of the present invention are flexible in application. For example, the system for measuring fluid perturbation 1100 of FIG. 11 may be used in tanks in research laboratories, field deployments, or tanks in industrial settings. Moreover, the system for measuring fluid perturbation 1200 of FIG. 12 is preferably used on pylons or similar structures located in a sediment bed in open water. Further still, the system for measuring fluid perturbation 1300 of FIG. 13 is preferably used in wells.

Fifth, the system of measuring fluid perturbation 100 of FIG. 1 provides data for detailed analysis by scientists, researchers, and engineers. Unlike the system of Wang and the system of Richards, which merely are used for automation and control and do not record data representing fluid perturbation, the system for measuring fluid perturbation 100 of FIG. 1 records and stores data representing fluid perturbation and displays the data representing fluid perturbation as shown in FIG. 9, FIG. 10, and FIG. 15. The data representing fluid perturbation recorded, stored, and displayed by the system for measuring fluid perturbation 100 of FIG. 1 may be used for detailed analysis by scientists, researchers, and engineers.

While particular elements, embodiments, and applications of the present invention have been shown and described, it is understood that the invention is not limited hereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A system for measuring fluid perturbation, said system including:
   a data management system;
   a control system;
   a sensor module;
   a sensor;
   a data management system aggregator;
   a data management system storage;
   a sensor module processor;
   wherein said data management system is in communication with said control system; wherein said data management system includes said data management system aggregator and said data management system storage; wherein said sensor module is electrically connected to said data management system; wherein said sensor module includes said sensor electrically connected to said sensor module microprocessor; wherein when a conductive fluid contacts said sensor, said sensor generates a data value representing said conductive fluid, wherein when said sensor module microprocessor receives data representing a record request from said data management system, said sensor module microprocessor transmits said data value representing said conductive fluid from said sensor to said data management system, wherein when said data management system receives said data value representing said conductive fluid from said sensor, said data management system aggregator converts said data value representing said conductive fluid from said sensor into data representing fluid perturbation.

2. The system of claim 1 wherein said data management system storage is a universal serial bus, wherein when said data management system aggregator transmits said data representing fluid perturbation to said data management system storage, said data management system stores said data representing fluid perturbation.

3. The system of claim 2 wherein when said data management system storage receives data representing a display request from said control system, said data management system storage transmits said data representing fluid perturbation to said control system.

4. The system of claim 3 wherein when said control system receives said data representing fluid perturbation from said data management system storage, said control system displays said data representing fluid perturbation.

5. The system of claim 1 where said data management system microprocessor is a field programmable gate array.

6. The system of claim 1 wherein said sensor module microprocessor is a complex programmable logic device.

7. The system of claim 1 wherein said first value representing said conductive fluid is logic low.

8. The system of claim 1 wherein said second value representing said conductive fluid is logic high.

9. The system of claim 1 where when a predetermined time elapses, said sensor module microprocessor receives data representing a record request from said data management system.

10. A system for measuring fluid perturbation, said system including:
a sensor module comprising a sensor module processor and a plurality of sensors, wherein said sensor module processor is electrically connected to said plurality of sensors;
a data management system, wherein said data management system is electrically connected to said sensor module, wherein said data management system is capable of generating a record request and sending said record request to said sensor module, and wherein said data management system is capable of receiving data from said sensor module;
wherein, when said sensor module receives a record request from said data management system, said sensor module detects a state of each respective sensor of said plurality of sensors, said sensor module records each said state of each respective sensor of said plurality of sensors, and said sensor module communicates each of said recorded states to said data management system.

11. The system of claim 10, wherein said detected state of a given sensor of said plurality of sensors is a first state when said given sensor is in contact with a conductive fluid when detection occurs and is a second state when said given sensor is not in contact with a conductive fluid when detection occurs.

12. The system of claim 10 further comprising a control system, wherein said data management system is in communication with said control system.

13. The system of claim 12, wherein said control system communicates a record request time to said data management system.

14. The system of claim 13, wherein said data management system continues to communicate record requests to said sensor module until said record request time elapses.

15. The system of claim 13, wherein said data management system further comprises a data management system aggregator and a data management system storage, and wherein said data management system continues to communicate record requests to said sensor module until said record request time elapses or until said data management system storage is full.

16. The system of claim 10, further comprising a plurality of sensor modules, wherein said data management system is electrically connected to each respective sensor module of said plurality of sensor modules, wherein said data management system is capable of generating a record request and sending said record request to each respective sensor module of said plurality of sensor modules, and wherein said data management system is capable of receiving data from each respective sensor module of said plurality of sensor modules.

17. The system of claim 16, wherein, when a given sensor module of said plurality of sensor modules receives a record request from said data management system, said sensor module determines whether each respective sensor of said sensor module is in said first state or said second state, said sensor module records the state of each respective sensor, and said sensor module communicates said recorded states to said data management system.

18. The system of claim 10, further comprising a display, wherein said display is in communication with said data management system, and wherein said display is configured such that a first axis represents time and a second axis represents each respective sensor.

19. The system of claim 10, wherein said plurality of sensors are arranged in a two-dimensional grid on said sensor module.

20. The system of claim 10, further comprising a structure with a surface, where said surface may come into contact with a conductive fluid, and where said sensor module is fixed to said surface, thereby allowing said sensor module to detect and record a wave motion in said conductive fluid at a point where said wave motion contacts said surface.

21. A method of detecting, recording and displaying fluid perturbation, said method comprising:
fixing a sensor module to a surface of a structure, where said surface may come into contact with a conductive fluid, and wherein said sensor module comprises a sensor module processor and a plurality of sensors, where said sensor module processor is electrically connected to said plurality of sensors;
communication by a data management system of a record quest from said data management system to said sensor module;
determination by said sensor module processor of whether each sensor of said plurality of sensors is in a first state or a second state;
recordation by said sensor module processor of the respective state of each respective sensor of said plurality of sensors;
communicating communication by said sensor module processor of said recording of respective states from said sensor module processor to said data management system;
aggregation of said recording of respective states into a data string by said data management system;
displaying said recording of respective states on a display in communication with said data management system, wherein said display is configured such that a first axis represents time and a second axis represents each respective sensor.

22. The method of claim 21, further comprising:
communication by a control system of a record time request from said control system to said data management system, whereby the communication of said record time request triggers communication by said data management system of said record request from said data management system to said sensor module.

23. A system for measuring fluid perturbation, said system including:
- a sensor module comprising a means for processing data and a means for detecting when a sensor comes into contact with a conductive fluid, wherein said processing means and said sensing means are electrically connected;
- a data management system, wherein said data management system is electrically connected to said sensor module, wherein said data management system comprises a means for generating a record request and a means for communicating said record request to said sensor module, a means for receiving data from said sensor module, and a means for storing data received from said sensor module;
- wherein a first state is detected when said sensing means comes into contact with a conductive fluid and a second state is detected when said sensing means does not come into contact with a conductive fluid; and
- wherein, when said sensor module receives a record request from said data management system, said sensor module records whether said sensing means is in said first state or said second state, communicates said recorded state to said data management system.

24. The system of claim 23, wherein said sensing means comprises a plurality of sensors.

25. The system of claim 23, further comprising a means for displaying said recorded state, wherein said display means is in communication with said data management system and wherein said display means is configured such that a first axis of said display represents time and a second axis of said display represents said recorded state.

* * * * *